US008856471B2

(12) United States Patent
Ezra

(10) Patent No.: US 8,856,471 B2
(45) Date of Patent: Oct. 7, 2014

(54) SYSTEM, METHOD AND A NON-TRANSITORY COMPUTER READABLE MEDIUM FOR CREATING A WARRANTED SNAPSHOT

(71) Applicant: Josef Ezra, Even Yehuda (IL)

(72) Inventor: Josef Ezra, Even Yehuda (IL)

(73) Assignee: Infinidat Ltd., Herzliya (IL)

( * ) Notice: Subject to any disclaimer, the term of this patent is extended or adjusted under 35 U.S.C. 154(b) by 163 days.

(21) Appl. No.: 13/705,415

(22) Filed: Dec. 5, 2012

(65) Prior Publication Data

US 2014/0156956 A1   Jun. 5, 2014

(51) Int. Cl.
*G06F 12/00* (2006.01)
*G06F 3/06* (2006.01)
*G06F 13/00* (2006.01)

(52) U.S. Cl.
CPC .............. *G06F 3/065* (2013.01); *G06F 3/0673* (2013.01); *G06F 3/0614* (2013.01)
USPC ............ 711/162; 711/100; 711/154; 711/161

(58) Field of Classification Search
CPC ............ G06F 11/1446; G06F 11/1448; G06F 11/1461
USPC .................................. 711/100, 154, 161, 162
See application file for complete search history.

(56) References Cited

U.S. PATENT DOCUMENTS

| 6,038,639 A * | 3/2000 | O'Brien et al. ................ 711/114 |
| 7,774,569 B1 * | 8/2010 | Chatterjee et al. ............ 711/163 |
| 8,219,768 B2 * | 7/2012 | Nishibori et al. ............. 711/162 |
| 2013/0054534 A1 * | 2/2013 | Eguchi et al. ................. 707/649 |

* cited by examiner

*Primary Examiner* — Tuan Thai
(74) *Attorney, Agent, or Firm* — Oren Reches

(57) ABSTRACT

A method for providing a warranted snapshot that may include: receiving a request to create a first warranted snapshot of a first logical volume at a first point in time and creating the first warranted snapshot if the first warranted snapshot is non-writable and if an amount of physical storage actually devoted by a storage system to the first logical volume at the first point of time does not exceed a size of a free physical storage space that is available for storing any future data delta associated with the first warranted snapshot. The creating of the first warranted snapshot may include allocating a first virtual portion of a physical storage space for storing any future data delta associated with the first warranted snapshot. A size of the first virtual portion equals the amount of physical storage actually devoted to the first logical volume at the first point of time.

20 Claims, 13 Drawing Sheets

SYSTEM, METHOD AND A NON-TRANSITORY COMPUTER READABLE MEDIUM FOR CREATING A WARRANTED SNAPSHOT

BACKGROUND

Thick and Thin Logical Volumes

There are two types of logical volumes—thick volumes and thin volumes.

A first perspective of these terms may refer to internal allocation issues. Under this perspective, the distinction is a purely internal one, and it is transparent to the user. In terms of internal space accounting, at the time of creation of the volume, the space devoted to the volume is taken into account, so that when all available space has been distributed among created volumes and snapshot pools, no new volumes may be created. This is true for both Thick and Thin volumes. The user is told that a volume of the chosen size is available to him.

The difference is that thick volumes are also fully allocated on the disks at the time of creation. When data is written to thick volumes it is stored in the disk locations that were allocated at the time of creation. Disk space allocated to pools is used as the need arises, but the overall space allocated to a pool is allocated from the outset. Thin volumes are taken into account for space accounting, but no specific allocation is done on the disk in advance. Accordingly, a creation of a thin volume may involve allocating a virtual portion of the pool for storing the thin volume—without actually allocating a physical space.

Only when data is written to the logical volume (actually on the destage step) the specific location on the disk is chosen. Under this approach the use of the thin volumes is that if the maximal total capacity of the system is TC, but the disks currently installed cover only a part of that total capacity, say PTC, then the total storage capacity may be distributed among the users from the beginning, and the actual physical capacity will be added as the need arise. But it will never be the case that more storage capacity is allowed to users than can possibly be contained in the system (a situation that could create a conflict—since the user is expecting to have a certain capacity and that will not be the case when he needs it).

A second perspective of these terms views thick volumes and thin volumes as an external allocation issue. Under this perspective, the idea is that more space may be assigned to users than actually there is in the machine. If a user is assigned a thin volume Vj with size VSj, then the system does not warrant that when the space is needed, if this is a thin volume, all the space VSj will indeed be available.

In general, in a system with static allocation it is more natural to define thick volumes as the standard and add special mechanisms for defining thin volumes. In systems with dynamic allocation (or log write, or write-anywhere) the natural thing is to define thin volumes as basic and then add special mechanisms for the thick volumes.

Space Management of a Storage System that Supports Snapshots

In a storage system with snapshots it is necessary to define a storage space devoted to storing the data deltas of the snapshots of a given volume or group of volumes. This is done typically in terms of "storage pools". A consistency group C of size SPC may include logical volumes (volumes) V1, . . . VJ, with sizes VS1, . . . VSJ.

The storage system can include a pool for the consistency group C, which is storage space of size SPCS.

Each volume may have snapshots SNj(i) wherein j is the identifier of the volume, and i is a running index of snapshots (points in time) for the given volume. According to the standard procedures for handling snapshots, once the snapshot is created and the volume associated with the volume is modified, then "data deltas" of data associated with certain snapshots have to be stored, and this is done with the help of the pool.

The pool helps define the amount of physical storage space that is devoted to snapshots for the group C. Inasmuch as data deltas are being created, the storage space assigned to the consistency group C will be depleted (and space may be recovered if snapshots are deleted).

At any point in time, it is possible that when a volume is overwritten and a data delta associated with a certain snapshot has to be stored, there is no further space in the pool to store it.

In such cases, different vendors follow different strategies, which depend on either (1) the internal functioning of the system and the advantages or disadvantages that its architecture provides in terms of quickly or slowly deleting snapshots or volumes or (2) policies that relate to what the vendor is willing or unwilling to responsibly warrant to the user. In general these strategies may comprise one of the following: (1) not allowing the completion of the write command; (2) deleting data associated with one of the existing snapshots according to some policy defined in advance (e.g., data associated with the oldest, or the newest, or the largest, or the smallest, etc. snapshot); (3) providing some mechanism that attempts to identify in advance potentially dangerous situations of space depletion and taking some measure to counter them.

Existing mechanisms for space management in a storage system with snapshots may yield unexpected situations of space depletion that will arise at time of critical performance thus creating problems for the user.

It is necessary to develop mechanisms that will prevent such situation, such as for example by means of warranting that snapshots of a certain size will never give rise to such problematic situations, i.e., that write requests directed at the volume will not fail because there is no space for additional data deltas related with the snapshot.

SUMMARY

According to an embodiment of the invention a method may be provided for providing a warranted snapshot, the method may include receiving a request to create a first warranted snapshot of a first logical volume at a first point in time; creating the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot; wherein the creating of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

The method may include failing to create the first warranted snapshot if the first warranted snapshot is non-writable and if (a) the amount of physical storage actually devoted by the storage system to the first logical volume at the first point of time exceeds (b) the size of the free physical storage space that is available for storing any future data delta associated with the first warranted snapshot.

The failing to create the first warranted snapshot may be followed by creating a non-warranted snapshot of the first logical volume at the first point in time.

The method may include receiving at least one future data delta associated with the first warranted snapshot and storing each of the at least one future data deltas within the physical storage space.

The method may include monitoring an amount of physical storage space actually devoted to any data delta associated with the first warranted snapshot.

The allocating of the first virtual portion of the physical storage space may or may not involve actually allocating an actual portion of the physical storage space of a size that equals the amount of physical storage actually devoted to the first logical volume at the first point of time.

The creating of the first warranted snapshot may or may not include actually allocating an actual portion of the physical storage space of a size that equals the amount of physical storage actually devoted to the first logical volume at the first point of time.

The physical storage space may be associated only with snapshots of the first volume.

The physical storage space may be associated with a consistency group that comprises the first logical volume and at least one other logical volume.

The first logical volume may be a thin logical volume and wherein the method may include monitoring actual allocation of physical storage space fractions to portions of the first logical volume and determining, in response to the monitoring, the amount of physical storage actually devoted by the storage system to the first logical volume at the first point of time.

The first logical volume may be a thick logical volume and wherein the method may include monitoring a utilization of physical storage space fractions of a physical storage space allocated to the first logical volume and determining, in response to the monitoring, the amount of physical storage actually devoted by the storage system to the first logical volume at the first point of time.

The method may include receiving a request to create a second warranted snapshot of the first logical volume at a second point in time; wherein the first warranted snapshot is a last snapshot of the first logical volume that was created before the second point in time; calculating a size of a free physical storage space that is available for storing any future data delta associated with the second warranted snapshot by taking into account an amount of physical storage space actually devoted to any data delta associated with the first warranted snapshot; creating the second warranted snapshot if the second warranted snapshot is non-writable and if (a) an amount of physical storage actually devoted by the storage system to the first logical volume at the second point of time does not exceed (b) a size of a free physical storage space that is available for storing any future data delta associated with the second warranted snapshot; wherein the creating of the second warranted snapshot comprises allocating a second virtual portion of the physical storage space that comprises the free physical storage space for storing any future data delta associated with the second warranted snapshot; wherein a size of the second virtual portion equals the amount of physical storage actually devoted to the first logical volume at the second point of time.

The method may include updating a size of the first virtual portion to the amount of physical storage space actually devoted to any data delta associated with the first warranted snapshot.

The method may include receiving a request to create a certain warranted snapshot that reflects the first logical volume at a certain point in time; creating the certain warranted snapshot if the certain warranted snapshot is writable and if (a) a size of the first logical volume at the certain point of time does not exceed (b) a size of a free physical storage space that is available for storing any future data delta associated with the certain warranted snapshot; wherein the creating of the certain warranted snapshot comprises allocating a certain virtual portion of the physical storage space that comprises the free physical storage space for storing any future data delta associated with the certain warranted snapshot; wherein a size of the certain virtual portion equals the size of the first logical volume at the certain point of time.

The method may include receiving a request to create, at a point in time that follows the first point in time, a writable warranted snapshot that reflects the first warranted snapshot; creating the writable warranted snapshot if the (a) a size of the first volume at the point in time does not exceed (b) a size of a free physical storage space that is available for storing any future data deltas associated with the writable warranted snapshot; wherein the creating of the writable warranted snapshot comprises allocating a virtual portion of the physical storage space for storing and any future data deltas associated with the writable warranted snapshot; wherein a size of the virtual portion equals the size of the first logical volume at the point of time.

According to an embodiment of the invention a method may be provided for providing a warranted snapshot, the method may include: receiving a request to create a first warranted snapshot of a first logical volume at a first point in time; determining whether a type of the first warranted snapshot is writable or non-writable; creating a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot; creating a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot; wherein the creating of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot; wherein the creating of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

Further embodiments of the invention include a computer readable medium that is non-transitory and may store instructions for performing the above-described methods and any steps thereof, including any combinations of same. For example, the computer readable medium may store instructions to be executed by a computerized system for: receiving a request to create a first warranted snapshot of a first logical volume at a first point in time; creating the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot; wherein the creating of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

A non-transitory computer readable medium that stores instructions to be executed by a computerized system for: receiving a request to create a first warranted snapshot of a first logical volume at a first point in time; determining whether a type of the first warranted snapshot is writable or non-writable; creating a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot; creating a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot; wherein the creating of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot; wherein the creating of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

Additional embodiments of the invention include a system arranged to execute any or all of the methods described above, including any stages—and any combinations of same. For example, the system may include a storage control unit arranged to receive a request to create a first warranted snapshot of a first logical volume at a first point in time; a warranted snapshot module arranged to create the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot; wherein a creation of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

Additional embodiments of the invention include a system arranged to execute any or all of the methods described above, including any stages—and any combinations of same. For example, the system may include a storage control unit arranged to receive a request to create a first warranted snapshot of a first logical volume at a first point in time and to determine whether a type of the first warranted snapshot is writable or non-writable; a warranted snapshot module arranged to create a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot; a non-warranted snapshot module arranged to create a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot; wherein a creation of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot; wherein a creation of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
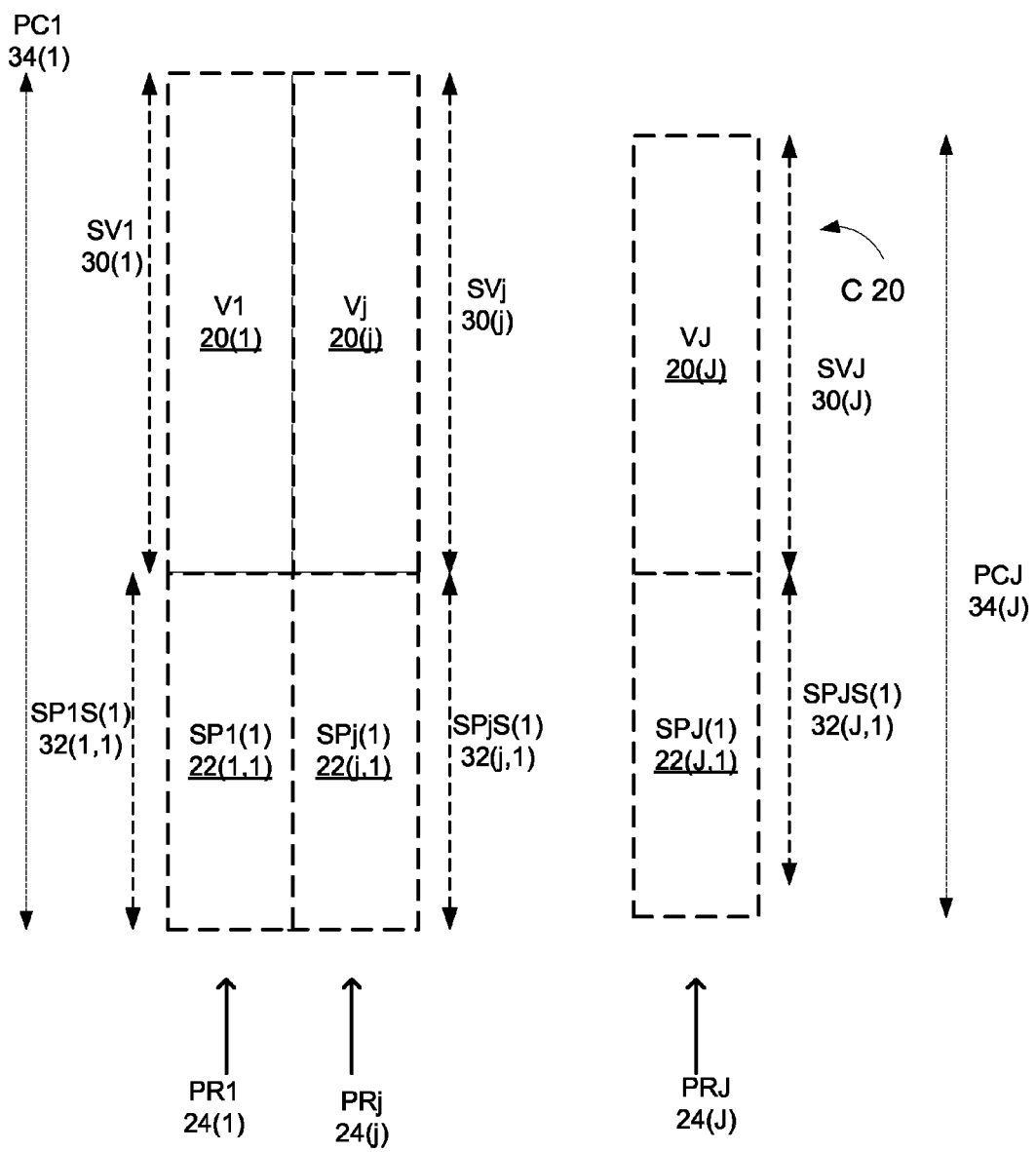
FIG. 1 illustrates various partitions, volumes and pools of a consistency group as they appear at a first point in time, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there may be provided a method for creating a warranted snapshot of a logical volume (or of another snapshot) at a certain point in time. If a warranted snapshot is created it is guaranteed that any future data delta associated with that warranted snapshot can be written to the storage system.

A warranted snapshot can be created if various conditions are fulfilled. For example, assuming that the warranted snapshot is a read only warranted snapshot then a size of free physical storage that can be allocated for any future data delta associated with the warranted snapshot should exceed the amount of physical storage actually devoted by a storage system to the first logical volume at the first point of time.

Yet for another example, assuming that the warranted snapshot is a writable warranted snapshot then the size of the free physical storage that can be allocated for any future data delta associated with the warranted snapshot should exceed the size of the entire volume.

The creation of a warranted snapshot may be involve performing a storage space accounting stage of allocating a virtual volume for the warranted snapshot—without actually allocating the storage space. This may be viewed as creating a warranted snapshot that is thin.

The following examples may refer to a system with dynamic allocation having a thin volume as the native approach. Still, the system may define for the user volumes which are "thick", in the sense that the space allocation is warranted for them (even though internally it works as thin). The warrant is provided by the space accounting mechanisms and not by actual allocation of space on the disks for data that has not been written.

Let us consider in more detail the space accounting mechanism. The storage system may, first of all, divide the total (net) capacity TC of the system into several partitions, $PR1 \ldots PRJ$, each with its own partial (net) capacity $PC1, \ldots PCJ$. $(PC1+ \ldots +PCJ \leq TC)$. In general, partition PCj has a net capacity of PCj.

FIG. 1 illustrates various partitions, volumes and pools of a consistency group as they appear at a first point in time, according to an embodiment of the invention.

Partitions PR1-PRJ 24(1)-24(J) of sizes PC1-PCJ 34(1)-34(J) includes thin volumes V1-VJ 20(1)-20(J) of sizes SV1(1)-SV(J) 30(1)-30(J) and pools SP1(1)-SPJ(1) 22(1,1)-22(1,J).

This figure illustrates index j as having a value between 1 and J. It is noted that index j ranges between 1 and J (including 1 and J). The dashed lines of FIG. 1 may be indicative of thin provisioning—allocation of virtual space and not actual allocation of physical storage space.

Figure 2:
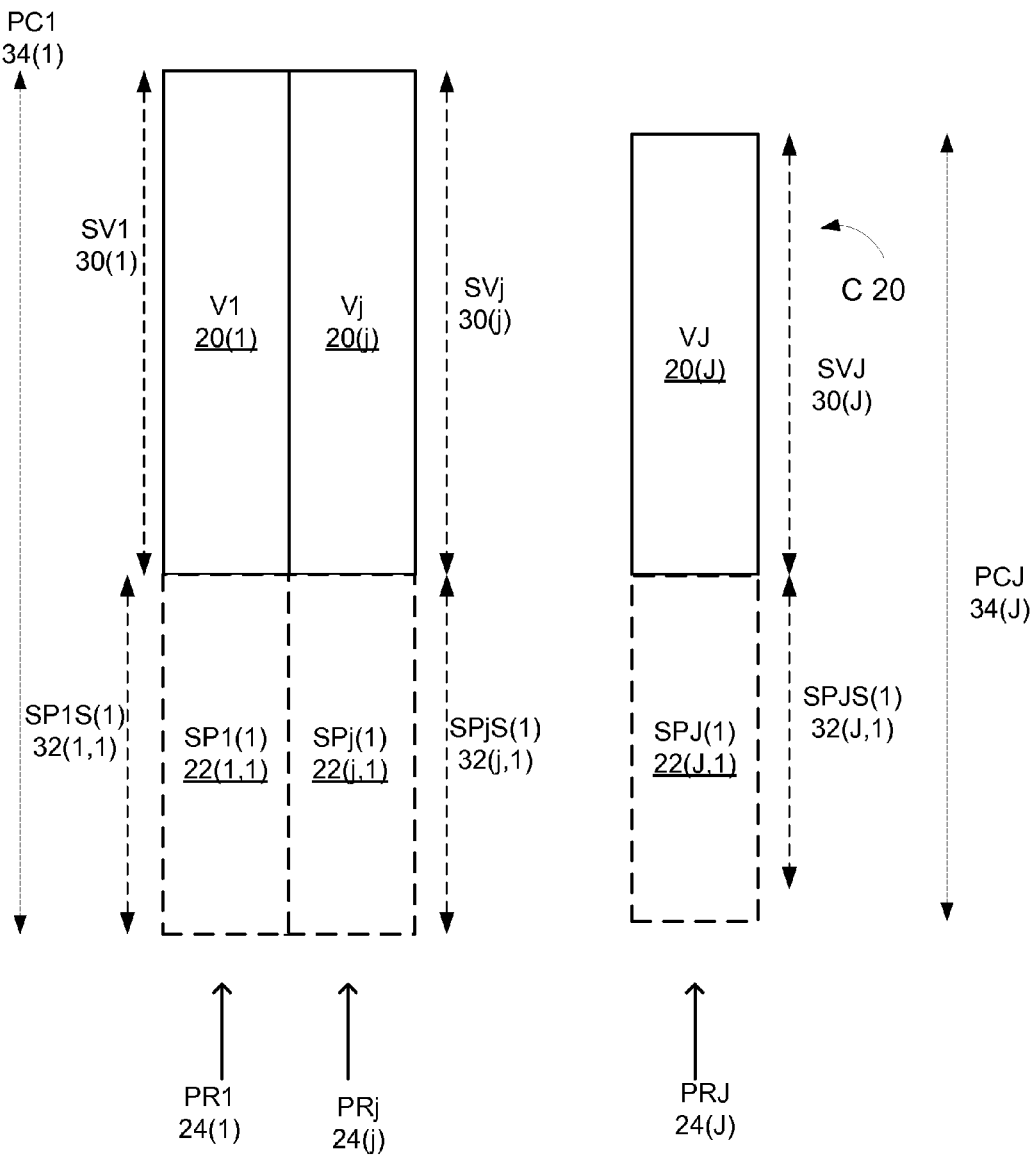
FIG. 2 illustrates various partitions, volumes and pools of a consistency group as they appear at a first point in time, according to an embodiment of the invention.

FIG. 2 illustrates various partitions, volumes and pools of a consistency group as they appear at a first point in time, according to an embodiment of the invention.

Partitions PR1-PRJ 24(1)-24(J) of sizes PC1-PCJ 34(1)-34(J) includes thick volumes V1-VJ 20(1)-20(J) of sizes SV1(1)-SV(J) 30(1)-30(J) and pools SP1(1)-SPJ(1) 22(1,1)-22(1,J). The continuous boxes that represent volumes V1-VJ 20(1)-20(J) are indicative of thick provisioning—actual allocation of physical storage space. It should be noted that each partition can include multiple logical volumes and a pool for storing data deltas associated with these multiple logical volumes.

According to an embodiment of the invention within a partition, PRj, the storage system may define a thick volume Vj of size SVj.

The storage system may also define a storage space (such as a pool) of size SPj (SPjS<PCj) and this pool will be associated with the family of Vj together with all of its snapshots. It is noted that the formation of thick volume Vj and the allocation of a pool per a single volume is optional. For example, a pool or any other type of memory space can be shared between multiple volumes that may form a consistency group. Yet for another example, the volume Vj can be defined as a thin volume.

Thus, out of SPjS, SVj is devoted to Vj and this space is warranted to be there, available for any write request directed at Vj, which cannot fail for lack of space. The rest of the space, SPjS–SVj, remains available for use for the snapshots of Vj.

Notice, however, that SVj is a fixed number that is defined once and for all at the time of creation of the volume. A different, continuously changing parameter is AUSVj(i), which indicates the actual amount of physical storage that is currently devoted to data associated with Vj at the i'th point in time. Clearly AUSVj(i)≤SVj.

Likewise, SPjS is a fixed number defined in advance, and at any point in time (such as the i'th point in time) there is some amount of physical storage space in the pool, FSPjS(i), which is actually free for storing new data and that has not been allocated to data deltas associated with any specific snapshot. Clearly FSPjS(i)≤SPjS.

It is noted that for simplicity of explanation a distinction is not made between dirty data and destaged data. That is, once data has been written to cache, it will be considered as data stored (or eventually to be stored) in the disks. The suggested system, method and computer readable medium take into account is just data that was written to the system, i.e., to cache.

Figure 3:
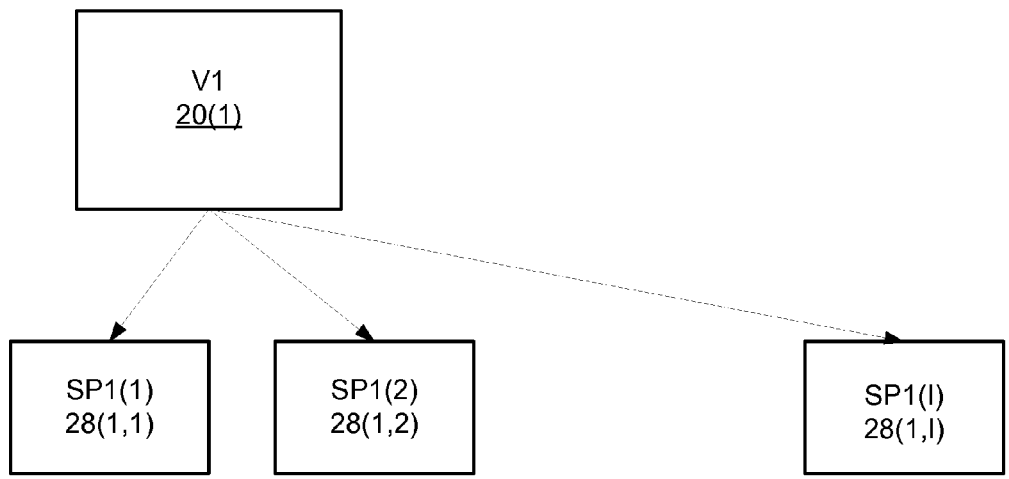
FIG. 3 illustrates a first logical volume and various snapshots according to various embodiments of the invention.
Figure 3:
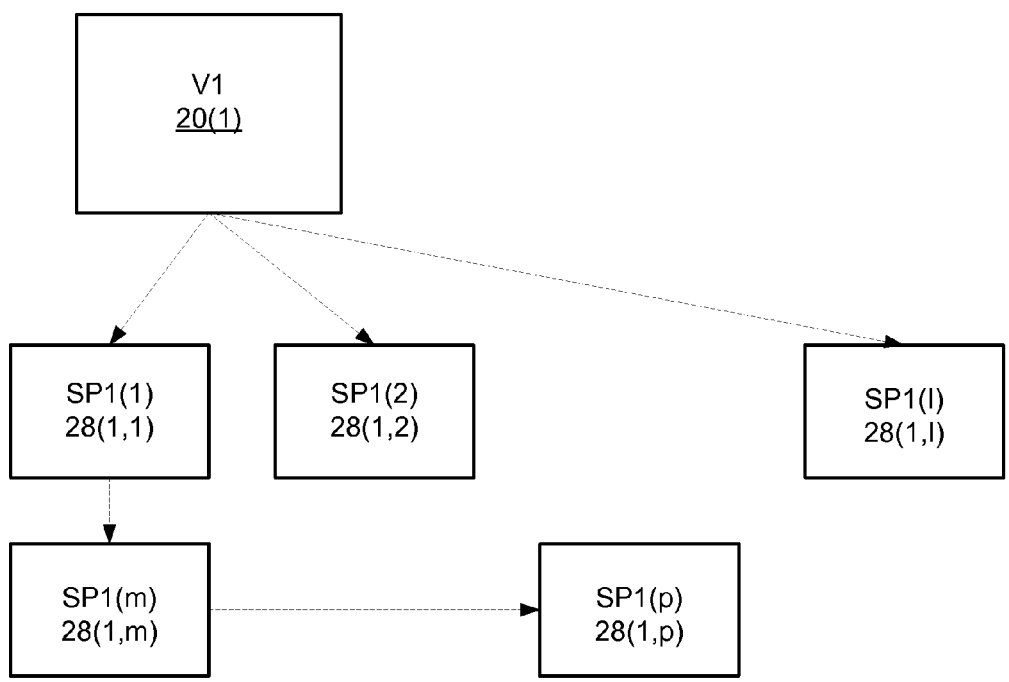

FIG. 3 illustrates a first logical volume and various snapshots according to various embodiments of the invention.

The top portion of FIG. 3 illustrates a first logical volume V1 20(1) and multiple snapshots SP1(1)-SP1(I) 28(1,1)-28(1,I) of that first logical volume taken at points of time denoted 1 till I. These snapshots can be read-only snapshots.

The lower portion of FIG. 3 illustrates a first logical volume V1 20(1), multiple snapshots SP1(1)-SP1(I) 28(1,1)-28(1,1) of that first logical volume taken at points of time denoted 1 till I, a writable snapshot SP1(m) 28(1,m) of snapshot SP1(2) 28(1,2) and a read-only snapshot SP1(p) 28(1,p) of writable snapshot SP1(m) 28(1,m).

The timing of the creation of snapshots of one generation of snapshots may be independent from the timing of the creation of snapshots of another generation. Referring to the example set above snapshot SP1(m) can be created at any point in time after the creation of SP1(1) and SP1(p) can be created at any point of time after the creation of SP1(m). There should be no binding relationships between the timing of creation of SP1(m) and the timing of creations of any of the snapshots SN1(1)-SP1(I).

Creation of a First Non-Writable Snapshot of a Volume

Referring to FIG. 1, assuming that the storage system creates a snapshot SNj(1) of Vj at time TSNj(1). Assume that a write request addressed at Vj arrives at a later time TT and that it is an overwrite of existing data portion. This means, that as part of the copy-on-write mechanism, a data delta will be associated now with SNj(1). That is, a data portion (to be modified) that was stored in the storage system and was previously associated with the volume Vj will be written as a data delta to the storage space allocated to data deltas associated with SNj(1), and the new data (that is intended to replace the old data) will be associated with Vj—it may be written to the storage space allocated for storing volume Vj.

After a non-warranted snapshot is created—if there is no space available for storing a data delta associated with that non-warranted snapshot, then a special response should be taken—either the writing of the data delta will fail or the non-warranted snapshot has to be deleted.

According to an embodiment of the invention there is provided a method, system and computer readable medium for creating a warranted snapshot for which, right at TSNj(1) the storage system can guarantee that there will always be space for all future data deltas, so that the write request directed at Vj will never fail because of lack of space for data associated with SNj(1). If the storage system realizes that it cannot warrant the space as requested, then the warranted snapshot creation fails.

According to an embodiment of the invention if first snapshot of the volume is requested to be a warranted snapshot, then future snapshots of the same volume may be requested to be warranted—but this is not necessarily so. Thus—at least one future snapshot of that volume can be requested to be created as a non-warranted snapshot. This may result from failures in a creation of warranted snapshots for this volume or from any other reason (such as a change in policy).

According to an embodiment of the invention, if the first snapshot of the volume was not warranted (a creation of a warranted snapshot failed or the first snapshot was not intended to be warranted) then subsequent snapshots are not requested to be warranted.

Yet according to a further embodiment of the invention a snapshot of a volume can be warranted even if the first snapshot was not warranted.

Yet according to yet a further embodiment of the invention a snapshot that is created as a non-warranted snapshot can change its status to be a warranted snapshot—if the criterion for warranted snapshot is fulfilled. The change in status can be triggered by a user, by a storage administrator, automatically, randomly, semi-randomly, as a result of a change in the free physical storage space that can be allocated for snapshots and the like.

It is noted that a warranted snapshot can become unwarranted—if a request to do so is generated. The user and additionally or alternatively the storage administrator can change the status. Such a change can also result from a storage policy that may allocate different importance to snapshots as a function of their creation time, a period that lapsed since their creation and the like.

According to an embodiment of the invention the storage system may maintain a table (or other database) in which to each warranted snapshot SNj(1) in the storage system is associated with WSSNj(1) that stands for warranted storage space for SNj(1).

At the time (TSNj(1)) of creation of a snapshot SNj(1) the storage system may attempt to find out what is the maximal amount of physical storage space that will be needed in order to create SNj(1) as a warranted snapshot so that as time goes by, there will always be enough space to store data deltas eventually associated with SNj(1).

The maximal amount of physical storage space that will be needed in order to create SNj(1) as a warranted snapshot is denoted MSSNj(1).

If the warranted snapshot is a read only snapshot then at the worst case scenario each portion of data that had been actually written to the volume at the time of creation of the snapshot, and for which therefore existed some physical space allocated in the disks at the time of creation, will be modified and a data delta will be formed for the warranted snapshot for each data portion of the volume stored at the time of creation. Modifications of portions of the volume that were made after the time of creation of the warranted snapshot and involve data elements that did not belong to the volume at the time of the creation of the warranted snapshot will not affect the warranted snapshot. Accordingly MSSNj(1) should not exceed AUSVj(1).

According to an embodiment of the invention the evaluation of whether a snapshot (SNn) can be created as a warranted snapshot involves comparing (at TSNj(1)) the amount of physical storage space currently available (free space) in the respective pool (FSPj(1)S) with FSPj(1)S. The decision if SNj(1) can be created with warranted space is based on this comparison.

It is noted that at TSNj(1), when the creation of warranted snapshot SNj(1) is evaluated the storage system knows that after SNj(1) has been created and as write requests continue to arrive for Vj, the largest possible amount of data deltas that may be eventually created to be associated with SNj(1) is AUSVj(1). Actually, it may happen to be much less than this, but we are sure that we will not need more than this. That is, if all data associated with Vj at time Tj(1) is eventually overwritten, so that all of the old data becomes data deltas associated with SNj(1), then the amount of space needed to store all these data deltas will be exactly AUSVj(1), and no more space than this will be ever needed for data deltas associated with SNj(1). Thus, at time TSNj(1), the storage system can assume that MSSNj(1)=AUSVj(1).

Accordingly, the creation of the first warranted snapshot of volume Vj may include:
A. Determining MSSNj(1).
B. Determining FSPj(1)S.
C. Checking if FSPj(1)S>MSSNj(1) (AUSVj(1)).
D. If FSPj(1)S does not exceed MSSNj(1) then the creation of a warranted snapshot fails—as the storage system cannot warrant having enough space for all possibly ensuing data deltas for this snapshot. The storage system can generate a warranted snapshot failure message, can create the snapshot as a non-warranted snapshot and the like.
E. If FSPj(1)S exceeds MSSNj(1) that the creation of a warranted snapshot is feasible and SNj(1) is created as a warranted snapshot. The storage system may also issue a "success" message or a message that indicates that "the requested snapshot has been created and it has a warranted space of <MSSNj(1)>"].
F. Once a warranted snapshot is created the amount of memory space that is free for the creation of other warranted snapshots of the volume is decreased. The method may include setting WSSNj(1) to MSSNj(1) and setting FSPj(1)S to FSPj(1)S-MSSNj(1).

Figure 4:
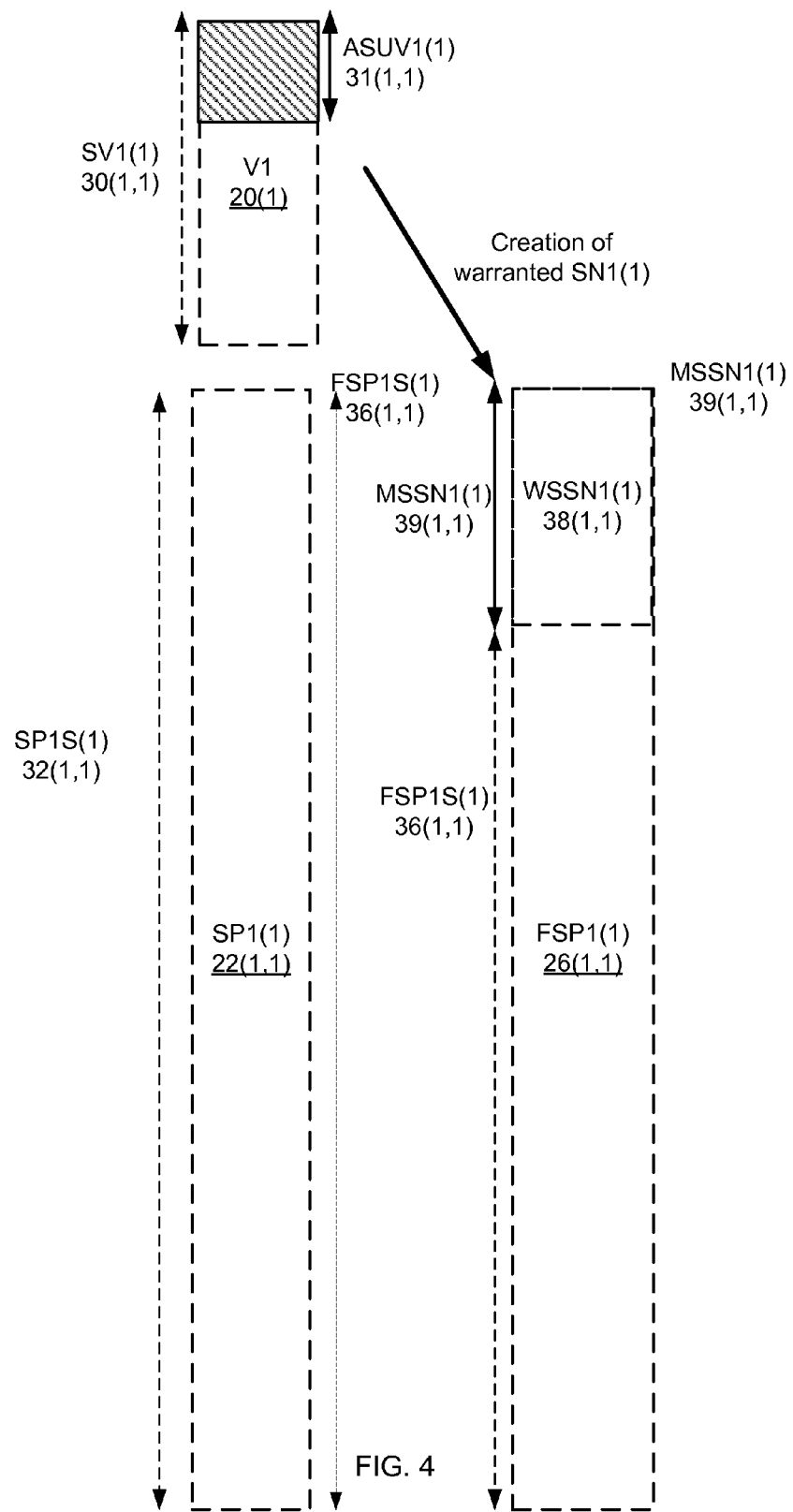
FIG. 4 illustrates the creation of a first read-only (non-writable) warranted snapshot of a first logical volume at a first point in time according to an embodiment of the invention.

FIG. 4 illustrates the creation of a first read-only (non-writable) warranted snapshot SN1(1) of a first logical volume V1 20(1) at a first point in time according to an embodiment of the invention.

The size of V1 20(1) is SV1(1) 30(1,1). The size of the first partition is denoted SP1S(1) 32(1,1). Before the creation of SN1(1) the size of the first partition SP1S(1) 32(1,1) equals the size (FSP1S(1) 36(1,1)) of the free space FSP1(1) 26(1,1) of the first partition.

At the first point in time ASUV(1,1) 31(1,1) is smaller than FSP1S(1) 36(1,1) and thus the SN1(1) can be created—the size (MSSN1(1,1) 39(1,1)) of WSSN1(1) 38(1,1) equals ASUV(1,1) 31(1,1) and FSP1S(1)=FSP1S(1)-ASUV(1,1).

Figure 6:
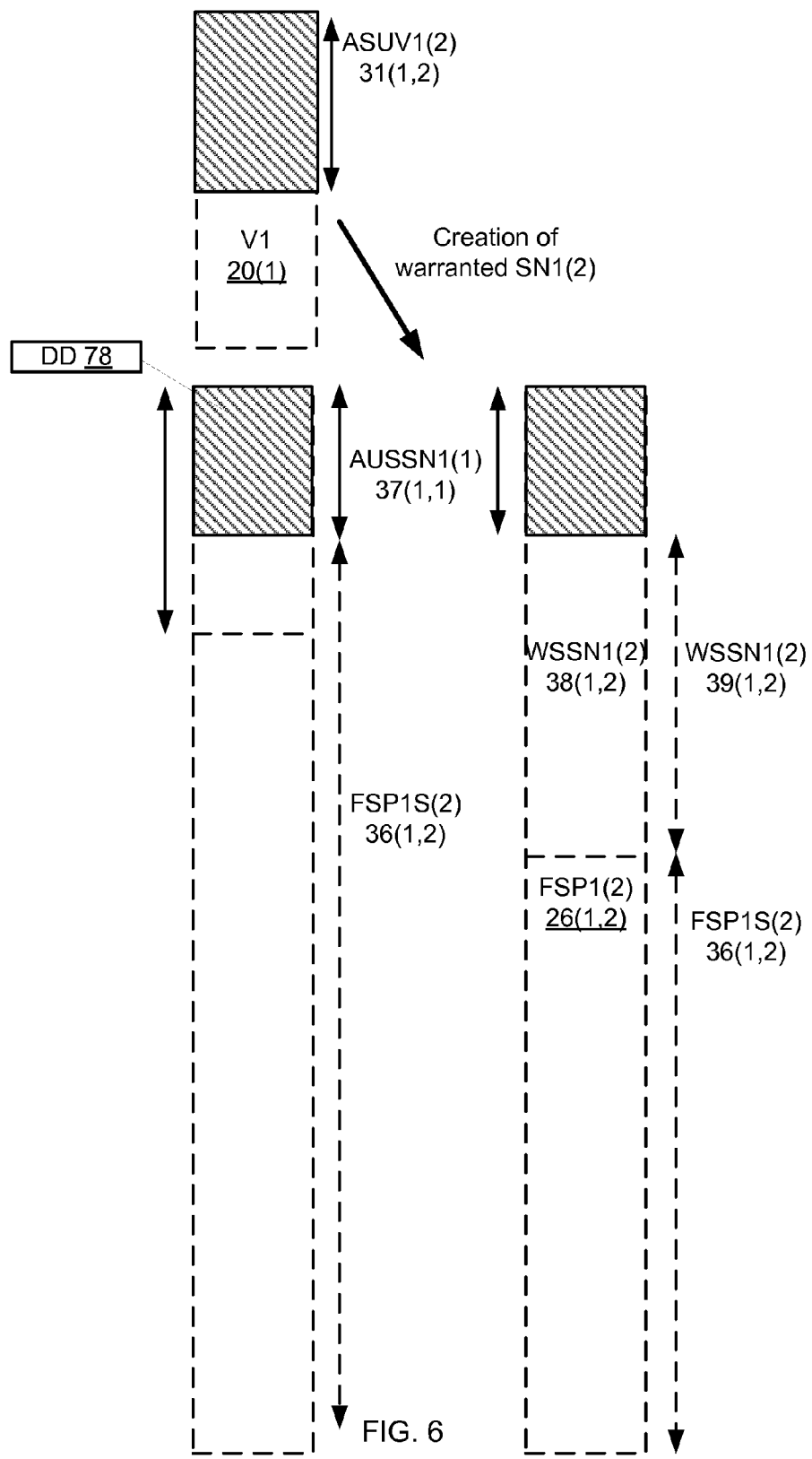
FIG. 6 illustrates the creation of a second read-only (non-writable) warranted snapshot of a first logical volume at a second point in time according to an embodiment of the invention.

After the creation of the warranted snapshot SNj(1), write requests will continue to arrive for Vj. Some of these will be overwrites to data existing before STNj(1), and hence they will produce data deltas that will be stored in the pool in association with SNj(1). In terms of space accounting, no changes will be made when such data deltas are produced, since they will be stored in a space that was already calculated as WSSNj(1) at TSNj(1) and it was intended as dedicated to these data deltas, associated with SNj(1). Referring to FIG. 6—the storage of data deltas (such as DD 78) associated with SN1(1) will result in an actual utilization of the storage space so that at a second point in time a size of AUSSN1(1) 37(1,1) will be actually populated with data deltas associated with SN1(1).

The mentioned above calculations are made when the first warranted snapshot of a certain volume is created.

Determining the actual amount of physical storage that is currently (at time TSNj(i)) devoted to data associated with volume (ASUVj(i)) if volume Vj is a thick volume and it is opened by a storage system that does not support thin volumes. ASUVj(i) is inherently calculated in thin volume systems as a thin volume does not include allocating the entire physical space for the entire volume—just allocating the memory space required for storing the actual data of the volume.

Monitoring the actual allocation of storage space fractions to portions of a first logical volume—calculating ASUVj(i). The calculating of ASUVj(i) can be done in storage system that does not implement thick volumes. This can be done, for example, by using the "Never Written by Host" (NWBH) mechanism. In any storage system, there is a typical data unit or portion which is the basic building stone of volumes. Thus for instance, it can be decided that the system works with data portions of 64K or of 1 MB, and that when a volume is created it is virtually divided into as many portions as necessary and these are distributed and allocated in the disks (we are talking about thick volumes, so that the portions are allocated in the sense that the space is mapped, and not necessarily yet written to). The mechanism of NWBH includes adding a bit to the allocation map of the portions and setting it to ON at the time of creation. This bit is set OFF only when the portion is actually written to. NWBH is used for several kinds of purposes in which we do not want to handle portions that have not been written (this may be useful in procedures such as scrubbing, backup, rebuild, and others). Here it can be used in the step of determining MSSNj(i), because AUSVj(i) can be calculated by looking at the allocation table and counting the portions in which the NWBH bit is OFF. These are precisely the portions that have already been written, and the maximal space needed for data deltas for the snapshot being created will never be greater than this.

Figure 5:
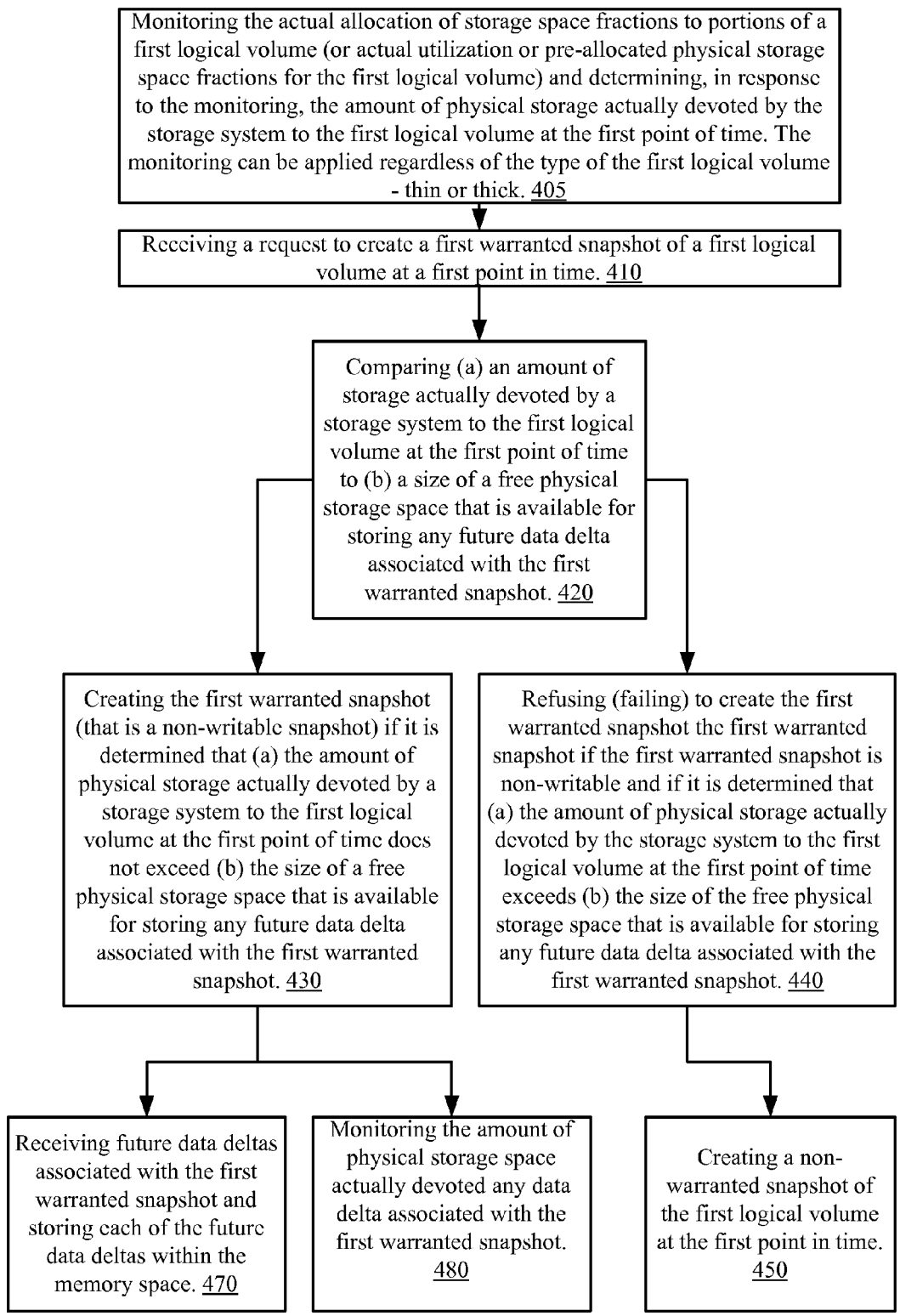
FIG. 5 illustrates a method for creating the first read-only (non-writable) warranted snapshot of a first logical volume according to an embodiment of the invention.

FIG. 5 illustrates method 400 for creating the first read-only (non-writable) warranted snapshot of a first logical volume according to an embodiment of the invention.

Method 400 may start by stage 405.

Stage 405 may include monitoring the actual allocation of storage space fractions to portions of a first logical volume and determining, in response to the monitoring, the amount of physical storage actually devoted by the storage system to the first logical volume at the first point of time. The monitoring can be applied regardless of the type of the first logical volume—thin or thick.

Stage 405 may be executed before, during and even after the execution of various other stages of method 400.

Method 400 may also include stage 410 receiving a request to create a first warranted snapshot of a first logical volume at a first point in time.

Stage 410 may be followed by stage 420 of comparing (a) an amount of storage actually devoted by a storage system to the first logical volume at the first point of time to (b) a size of a free physical storage space that is available for storing any future data delta associated with the first warranted snapshot.

Stage 420 may be followed by stage 430 of creating the first warranted snapshot (that is a non-writable snapshot) if it is determined that (a) the amount of physical storage actually devoted by a storage system to the first logical volume at the first point of time does not exceed (b) the size of a free physical storage space that is available for storing any future data delta associated with the first warranted snapshot.

The first warranted snapshot at the first point of time does not include any data deltas and may include metadata such as pointers to the locations of storage of the first logical volume. According to various embodiments of the invention this metadata can be stored in a memory space that is not allocated during the various stages of method 400. According to another embodiment of the invention the storage space required for storing the metadata can be taken into account by method 400.

Stage 430 may include allocating a first virtual portion of a storage space that comprises the free physical storage space for storing any future data deltas associated with the first warranted snapshot. The size of the first virtual portion equals the amount of physical storage actually devoted to the first logical volume at the first point of time.

Stage 430 may include creating a first warranted snapshot that is thick (actually allocating the entire storage space) or creating a first warranted snapshot that is thin. If the latter occurs the creating of the first warranted snapshot does not involve actually allocating an actual portion of the storage space of a size that equals the amount of physical storage actually devoted to the first logical volume at the first point of time.

The warranted snapshot can be created in a storage space such as a pool that may be allocated only to snapshots of the first logical volume or to a storage space (such as a pool) that can serve multiple logical volumes—the logical volumes can form a consistency group.

Stage 420 may be followed by stage 440 of refusing (failing) to create the first warranted snapshot the first warranted snapshot if the first warranted snapshot is non-writable and if it is determined that (a) the amount of physical storage actually devoted by the storage system to the first logical volume at the first point of time exceeds (b) the size of the free physical storage space that is available for storing any future data delta associated with the first warranted snapshot.

Stage 440 may be followed by stage 450 of creating a non-warranted snapshot of the first logical volume at the first point in time.

Stage 430 may be followed by stage 470 of receiving future data deltas associated with the first warranted snapshot and storing each of the future data deltas within the memory space.

Stage 430 may also be followed by stage 480 of monitoring the amount of physical storage space actually devoted any data delta associated with the first warranted snapshot. Stage 480 may also include monitoring the amount of physical storage space allocated to non-warranted snapshots.

Creation of a Non-Writable Snapshot of a Volume at the Presence of at Least One Previous Non-Writable Snapshot of the Volume When the next snapshot of the same volume is created—the first warranted snapshot reaches its maximal size as future data deltas will be associated with the next snapshot.

Accordingly—a part of the pool may exist that was allocated beforehand to SNj(1) was not used till TSNj(2) and will not be used anymore for data deltas related to SNj(1), since after TSNj(2) (and before any new snapshot is created), all new data deltas that arise as part of copy-on-write will be associated with SNj(2). This means that the storage system can restore the unused space to the free space remaining in the pool.

Accordingly—the storage space currently available in the pool for storing the next warranted snapshot should take into account only the actual amount of physical storage that is currently devoted to the first warranted snapshot (AUSSNj(1)) and not the maximal amount of physical storage space that could have been used WSSNj(1). In general, for each warranted snapshot that is not the first warranted snapshot of a certain volume AUSSNj(1) and WSSNj(1) can be defined wherein AUSSNj(1)≤WSSNj(1).

The calculations should also take into account changes in the volume Vj as new writes that are not overwrites, and that hence are added to what already existed prior to TSNj(1), are also stored in the pool in association with Vj, and they occupy additional space. This new space need to be duly accounted, and this is done by updating AUSVj(2).

Thus, the value of AUSVj(1) (as measured in TSNj(1)) may differ from AUSVJ(2) (As measured in and TSNj(2)).

At TSNj(2), when a creation of a second warranted snapshot SNj(2) is requested similar calculation are made but the values of various variables can change.

As before the determination of whether a warranted snapshot can be created may include comparing MSSNj(2) with FSPjS(2).

MSSNj(2) should equal AUSVj(2).

As indicated above FSPjS(2) should be calculated by taking into account the actual amount of physical storage that is currently devoted to data associated with SNj(1)—and not to WSSNj(1). Accordingly FSPjS(2)=FSPiS(1)+(MSSNj(1)−AUSSNj(1)).

A. Determining MSSNj(2).
B. Determining FSPjS(2). FSPjS(2)=FSPjS(1)+(MSSNj(1)−AUSSNj(1)).
C. Checking if FSPjS(2)>MSSNj(2), wherein MSSHj(2)=AUSVj(2).
D. If FSPjS(2) does not exceed MSSNj(2) then the creation of a warranted snapshot fails—as the storage system cannot warrant having enough space for all possibly ensuing data deltas for this snapshot. The storage system can generate a warranted snapshot failure message, can create the snapshot as a non-warranted snapshot and the like.
E. If FSPjS(2) exceeds MSSNj(2) that the creation of a warranted snapshot is feasible and SNj(2) is created as a warranted snapshot. The storage system may also issue a "success" message or a message that indicates that "the requested snapshot has been created and it has a warranted space of <MSSNj(2)>"].
F. Once a warranted snapshot is created the amount of memory space that is free for the creation of other warranted snapshots of the volume is decreased. The method may include setting WSSNj(2) to MSSNj(2) and setting FSPjS(2) to FSPjS(2) −MSSNj(2).

FIG. 6 illustrates the creation of a second read-only (non-writable) warranted snapshot SN1(2) of a first logical volume V1 20(1) at a second point in time according to an embodiment of the invention.

At the second point in time the data deltas associated with SN1(1) actually consume AUSSN1(1) 37(1,1) out of MSSN1(1) 37(1,1). The size (FSP1S(2) 36(1,2)) of free space FSP1(2) 26(1,2) equals SP1S(1) −AUSSN1(1).

At the second point in time ASUV(1,2) 31(1,2) is smaller than FSP1S(2) 36(1,2) and thus the SN1(2) can be created— the size (MSSN1(1,2) 37(1,2)) of WSSN1(2) 38(1,2) equals ASUV(1,2) 31(1,2) and FSP1S(2)=FSP1S(2)−ASUV(1,2).

In general, for warranted snapshot SNi the method may include:

A. Determining MSSNj(i).
B. Determining FSPjS(i).
C. Checking if FSPjS(i)>MSSNj(i)=(AUSVj(i)).
D. If FSPjS(i) does not exceed MSSNj(i) then the creation of a warranted snapshot fails—as the storage system cannot warrant having enough space for all possibly ensuing data deltas for this snapshot. The storage system can generate a warranted snapshot failure message, can create the snapshot as a non-warranted snapshot and the like.
E. If FSPjS(i) exceeds MSSNj(i) that the creation of a warranted snapshot is feasible and SNj(i) is created as a warranted snapshot. The storage system may also issue a "success" message or a message that indicates that "the requested snapshot has been created and it has a warranted space of <MSSNj(i)>"].
F. Once a warranted snapshot is created the amount of memory space that is free for the creation of other warranted snapshots of the volume is decreased. The method may include setting WSSNj(i) to MSSNj(i) and setting FSPjS(i) to FSPjS(i)−MSSNj(i).

The method may be repeated for each warranted snapshot and as long as FSPjS(i)>0, in which case no new warranted snapshots can be created.

It is noted that FSPjS(i) can be altered when one or more snapshots are deleted.

Figure 7:
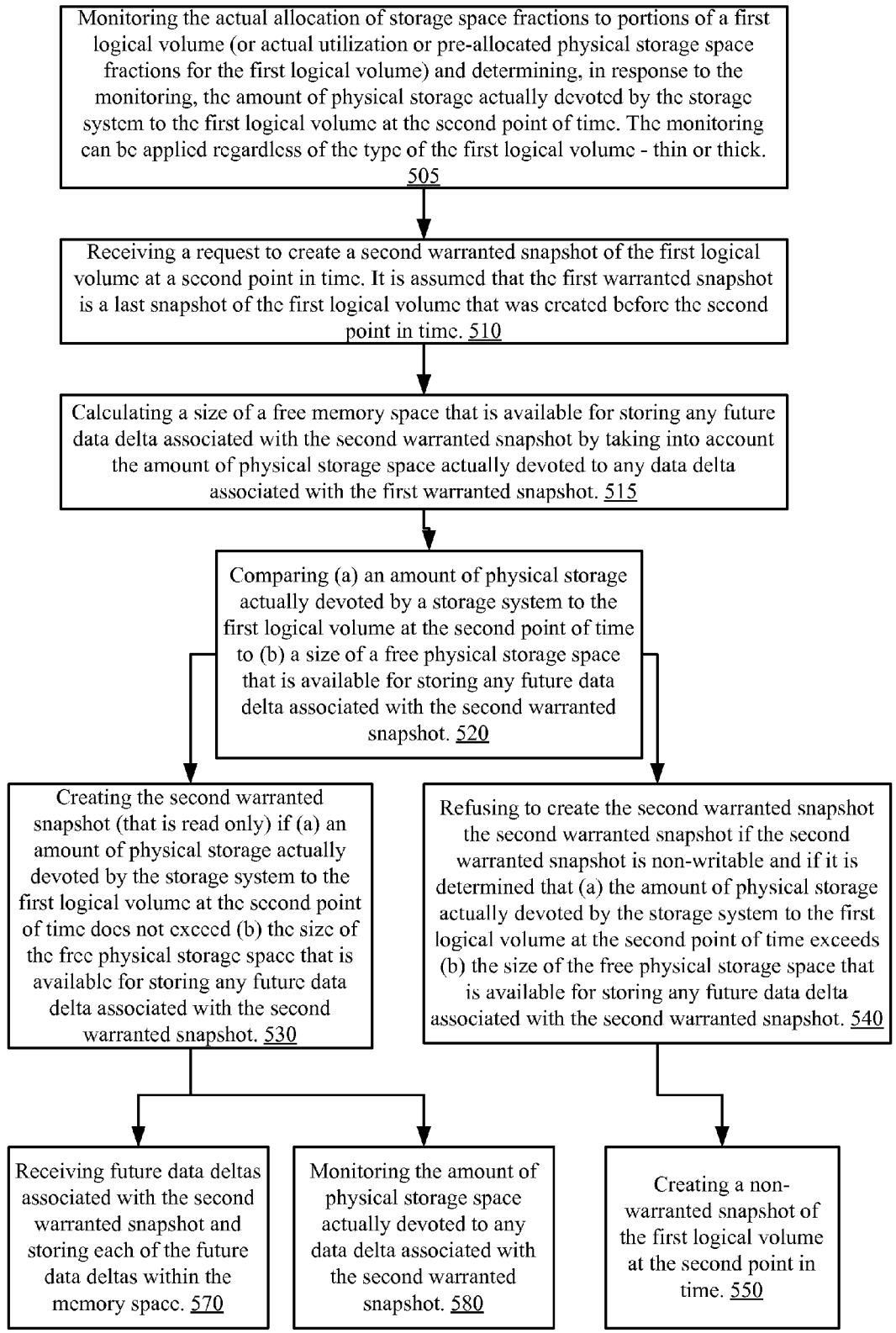
FIG. 7 illustrates a method for creating of a second read-only (non-writable) warranted snapshot of a first logical volume according to an embodiment of the invention.

FIG. 7 illustrates method 500 for creating of a second read-only (non-writable) warranted snapshot of a first logical volume according to an embodiment of the invention. Method 500 can follow method 400.

Method 500 may start by stage 505 of monitoring the actual allocation of storage space fractions to portions of a first logical volume (or actual utilization or pre-allocated physical storage space fractions for the first logical volume) and determining, in response to the monitoring, the amount of physical storage actually devoted by the storage system to the first logical volume at the second point of time. The monitoring can be applied regardless of the type of the first logical volume—thin or thick.

Stage 505 may be followed by stage 510 of receiving a request to create a second warranted snapshot of the first logical volume at a second point in time. It is assumed that the first warranted snapshot is a last snapshot of the first logical volume that was created before the second point in time.

Stage 510 may be followed by stage 515 of calculating a size of a free memory space that is available for storing any future data delta associated with the second warranted snapshot by taking into account the amount of physical storage space actually devoted to any data delta associated with the first warranted snapshot (as monitored during stage 480).

Stage 515 may also include updating a size of the first virtual portion to the amount of physical storage space actually devoted to any data delta associated with any previous snapshot such as the first warranted snapshot.

Stage 515 may be followed by stage 520 of comparing (a) an amount of physical storage actually devoted by a storage system to the first logical volume at the second point of time to (b) a size of a free physical storage space that is available for storing any future data delta associated with the second warranted snapshot.

Stage 520 may be followed by stage 530 of creating the second warranted snapshot (that is read only) if (a) an amount of physical storage actually devoted by the storage system to the first logical volume at the second point of time does not exceed (b) the size of the free physical storage space that is available for storing any future data delta associated with the second warranted snapshot.

Stage 530 may include creating a second warranted snapshot that is thick (actually allocating the entire storage space) or creating a second warranted snapshot that is thin. If the latter occurs the creating of the second warranted snapshot does not involve actually allocating an actual portion of the storage space of a size that equals the amount of physical storage actually devoted to the first logical volume at the second point of time.

The warranted snapshot may be created in a storage space such as a pool that may be allocated only to snapshots of the first logical volume or to a storage space (such as a pool) that can serve multiple logical volumes—the logical volumes can form a consistency group.

Stage 520 may be followed by stage 540 of refusing to create the second warranted snapshot the second warranted snapshot if the second warranted snapshot is non-writable and if it is determined that (a) the amount of physical storage actually devoted by the storage system to the first logical volume at the second point of time exceeds (b) the size of the free physical storage space that is available for storing any future data delta associated with the second warranted snapshot.

Stage 540 may be followed by stage 550 of creating a non-warranted snapshot of the first logical volume at the second point in time.

Stage 530 may be followed by stage 570 of receiving future data deltas associated with the second warranted snapshot and storing each of the future data deltas within the memory space.

Stage 530 may also be followed by stage 580 of monitoring the amount of physical storage space actually devoted to any data delta associated with the second warranted snapshot. Stage 580 may also include monitoring the amount of physical storage space allocated to non-warranted snapshots.

It is noted that stages 510-580 may be repeated in relation to the creation of each next warranted snapshot of the first volume that is a read-only warranted snapshot.

It is noted that methods 400 and 500 may be adapted to manage warranted snapshots that are writable. The adaptation includes taking into account the size of the first logical volume at a certain point in time in which a warranted snapshot is requested to be created instead of taking into account the actual amount of physical storage devoted to the first logical volume at that certain point in time.

Creation of a Writable Clone

According to an embodiment of the invention writable snapshots can also be created. An example of a writable snapshot is also referred to as a writeable Clone.

It is noted that the any generation of snapshots can also include writable snapshots and that any snapshot may be writable—even if it is not a writable close of a snapshot.

Let SNj(m) be a writeable clone of a previously created snapshot of Vj(i) of volume Vj, created at time TSNj(m).

The storage system would like to warrant that at TSNj(m) there is enough space in the pool for storing whatever data deltas that will eventually be written to TSNj(m). Because the warranted snapshot is a writable snapshot then the required memory space is not limited for storing data deltas but for the entire clone, whose size is exactly that of the volume.

In a worst case scenario all of the writable clone will be overwritten with new data. Hence MSSNj(m) should equal SVj and the evaluation should take into account the size of the full volume and not just AUSVj(m).

Thus, the following process may occur:

A. Determining MSSNj(m). MSSNj(m)=SVj.
B. Determining FSPjS(m).
C. Checking if FSPjS(m)>MSSNj(m)=(SVj).
D. If FSPjS(m) does not exceed MSSNj(m) then the creation of a warranted snapshot fails—as the storage system cannot warrant having enough space for all possibly ensuing data deltas for this snapshot. The storage system can generate a warranted snapshot failure message, can create the snapshot as a non-warranted snapshot and the like.
E. If FSPjS(m) exceeds MSSNj(m) that the creation of a warranted snapshot is feasible and SNj(m) is created as a warranted snapshot. The storage system may also issue a "success" message or a message that indicates that "the requested snapshot has been created and it has a warranted space of <MSSNj(m)>"].
F. Once a warranted snapshot is created the amount of memory space that is free for the creation of other warranted snapshots of the volume is decreased. The method may include setting WSSNj(m) to MSSNj(m) and setting FSPjS(m) to FSPjS(m)−MSSNj(m)=FSPjS(m)−SVj.

Figure 8:
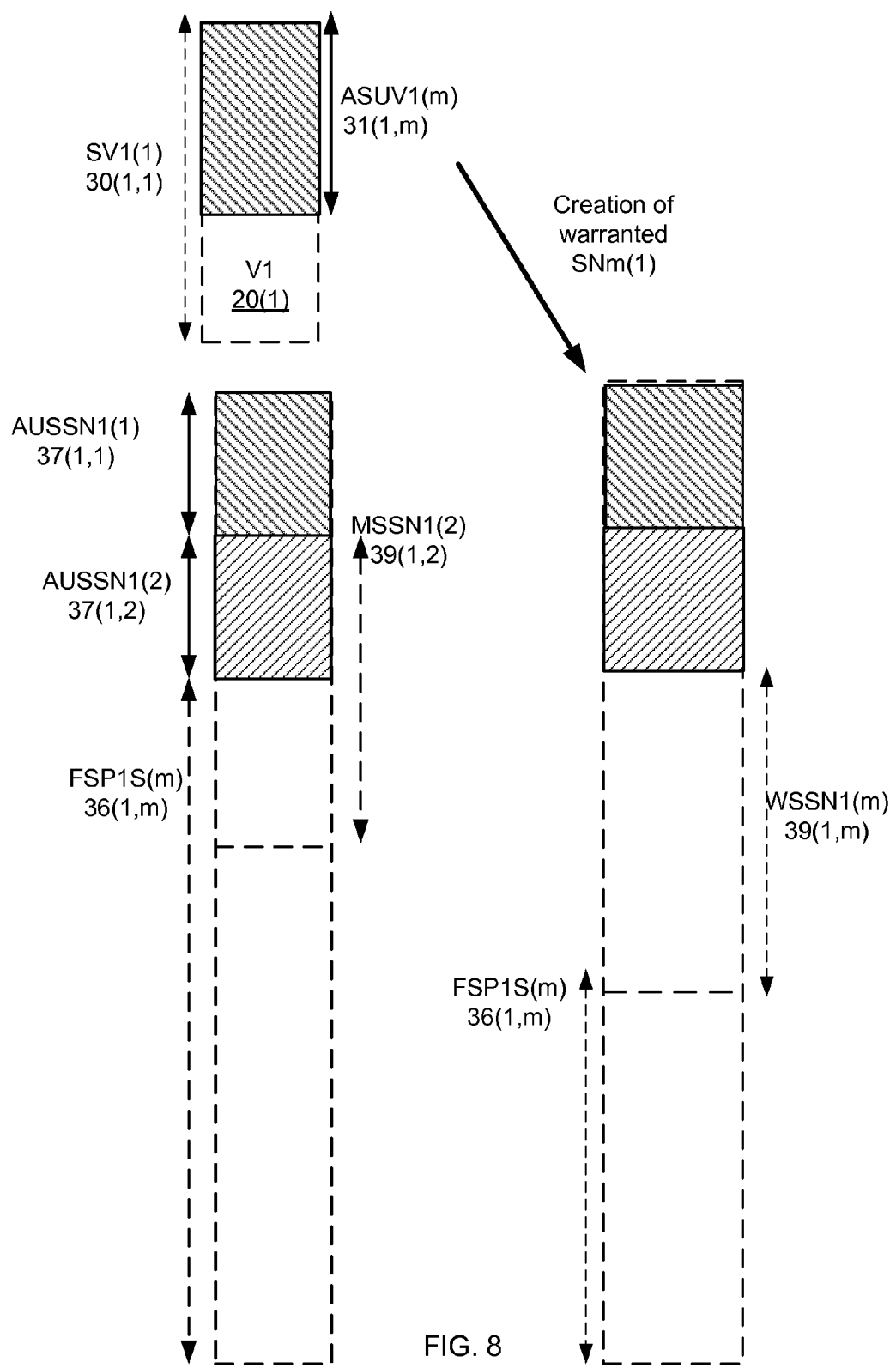
FIG. 8 illustrates the creation of a writable warranted snapshot of a first warranted snapshot of logical volume at a point in time that follows the first point in time according to an embodiment of the invention.
Figure 9:
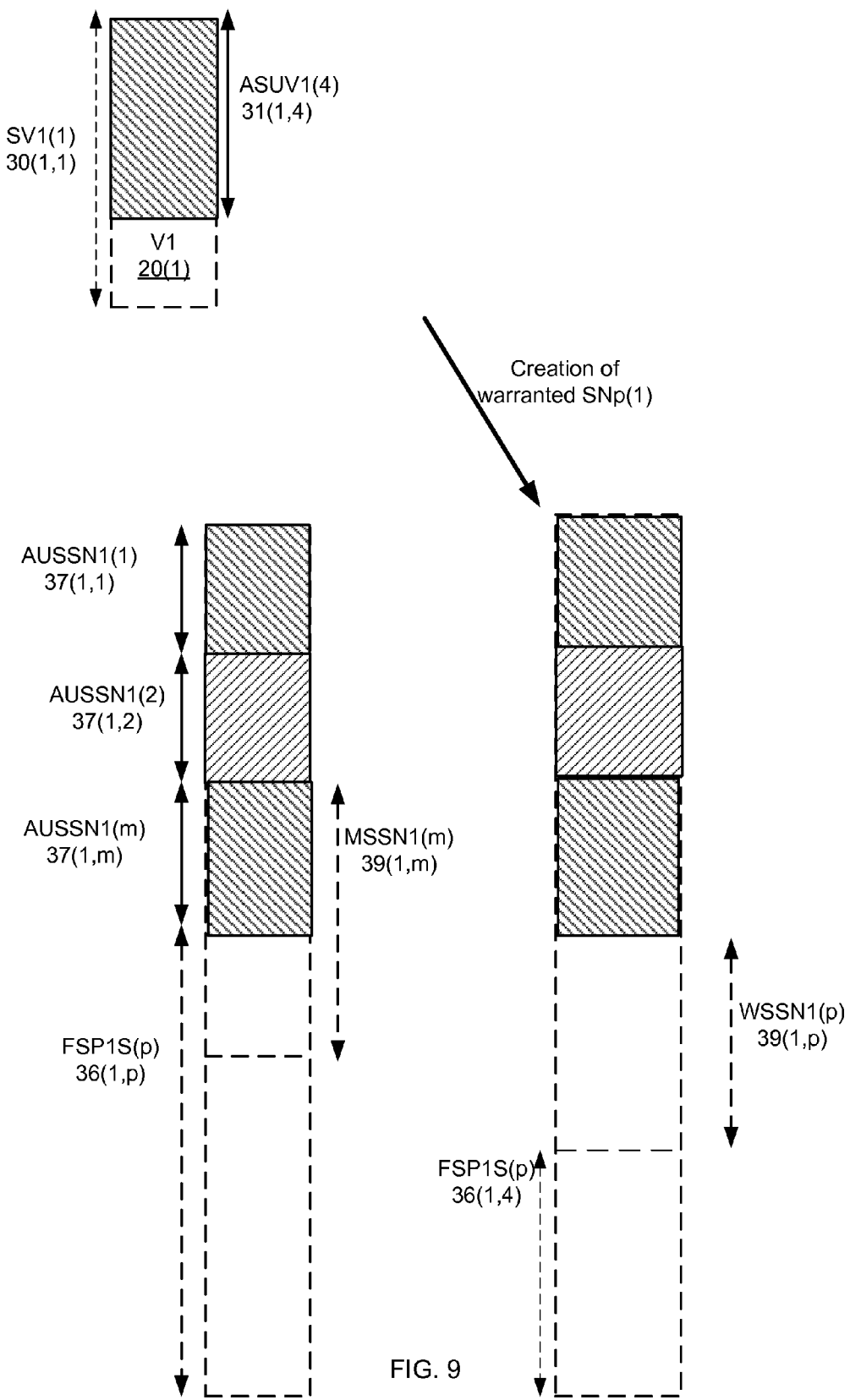
FIG. 9 illustrates the creation of a read-only warranted snapshot of a writable warranted snapshot at point in time according to an embodiment of the invention.

FIG. 8 illustrates the creation of a writable warranted snapshot SN1(m) of a first warranted snapshot SN1(1) of logical volume V1 20(1) at a point in time (TSNj(m)) that follows the first point in time according to an embodiment of the invention.

It is assumed (for simplicity of explanation only) that at point in time TSNj(m) the pool stores data deltas associated with SN1(1) and SN1(2).

At point in time TSNj(m) the data deltas associated with SN1(2) actually consume AUSSN1(2) 37(1,2) out of MSSN1(2) 37(1,2). The size (FSP1S(m) 36(1,m)) of free space FSP1(m) 26(1,m) equals SP1S(1)−AUSSN1(1)−AUSSN1(2).

At point in time TSNj(m) the size SV1(1) 30(1,1) of V1 20(1) is smaller than FSP1S(m) 36(1,m) and thus the SN1(m) may be created—the size (MSSN1(1,m) 37(1,m)) of WSSN1(m) 38(1,m) equals SV1(1) 30(1,1) and FSP1S(m)=FSP1S(m)−SV1(1).

It is noted that when snapshots of other snapshots are created then various variables such as the space utilized by the other snapshots and even the volume itself should be taken into account.

It is noted that according to one storage policy the odd generations of snapshots are non-writable while the even generations are writable—but other storage policies may be applied. An example of the former can include defining the original snapshots as non-writable (read only), defining clones to be writable and defining the children of the writable clones may be non writable.

Some of the previous example referred to a pool that is allocated to snapshots of a single volume. It is noted that the pool may be allocated to multiple volumes, such as volumes that form a consistency group.

Creation of a Non-Writable Snapshot of a Writable Snapshot

Any combination of any of the methods mentioned above may be applied. For example, a non-writable snapshot of a writable snapshot may be generated at a certain point in time—denoted TSNj(p).

Determining MSSNj(p) may similar to the cases described above but with some further considerations. Notice that we can look at the accounting process that started with SNj(m) at TSNJ(m) as the start of a process from the beginning. This means that if SNJ(p) is its first child, we could repeat the process as it started with SNJ(1) in relation with VJ, and then continue this process with all children of SNj(p). We would need to look at AUSVj(p) in relation with SNj(m), and use this value in determining MSSNj(p). However, it has to be noticed that the data actually stored in relation with SNj(m) has to take into account its entire lineage up to Vj. In the case of SNj(m) this means that there is some data actually stored specifically in relation with SNj(m), some data deltas associated with SNj(m) and some data stored in relation with Vj. It is easy for anyone versed in the art to see how this would work as an extension of the ideas described above in detail for the simpler case.

FIG. 7 illustrates the creation of a read-only warranted snapshot SN1(p) of a writable warranted snapshot SN1(m) at point in time TSN1(p) according to an embodiment of the invention.

It is assumed (for simplicity of explanation) that SN1(m) is the last snapshot created before SN1(p).

At the data deltas associated with SN1(1)-SN1(m) actually consume (AUSSN1(1)+ ... +AUSSN1(m)) out of MSSN1(p) 37(1,p). The size (FSP1S(p) 36(1,p)) of free space FSP1(p) 26(1,p) equals SP1S(1)−(AUSSN1(1)+ ... +AUSSN1(p)).

At TSN1(p) the size ASUV1(p) 31(1,p) is smaller than FSP1S(p) 36(1,p) and thus the SN1(p) may be created—the size (MSSN1(1,p) 37(1,p)) of WSSN1(p) 38(1,p) equals ASUV(p) 31(1,p) and FSP1S(p)=FSP1S(p)−ASUV1(p).

Creation of a Writable Snapshot of a Logical Volume

Figure 10:
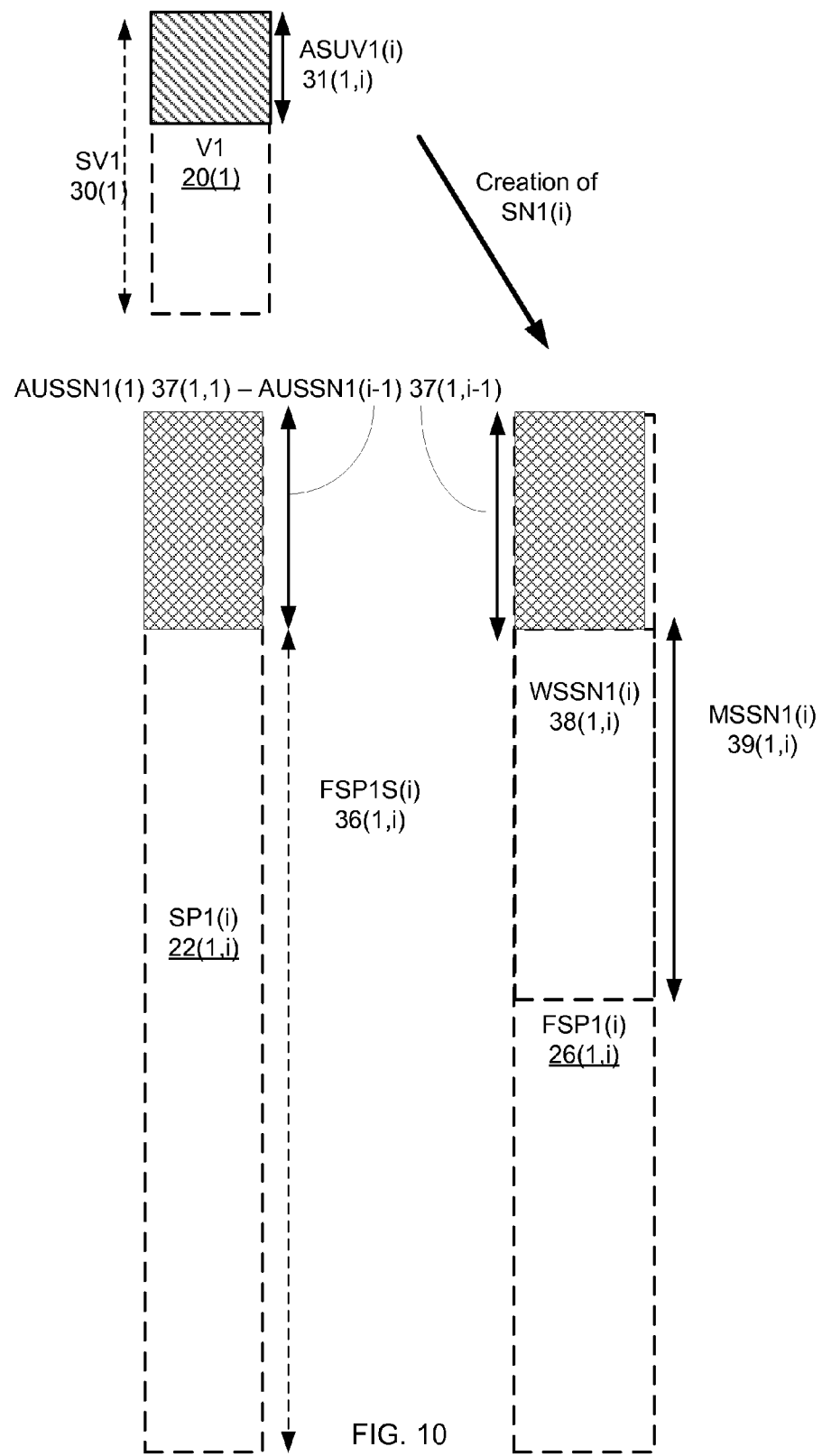
FIG. 10 illustrates the creation of a writable warranted snapshot of the first logical volume at a certain point in time according to an embodiment of the invention.
Figure 11:
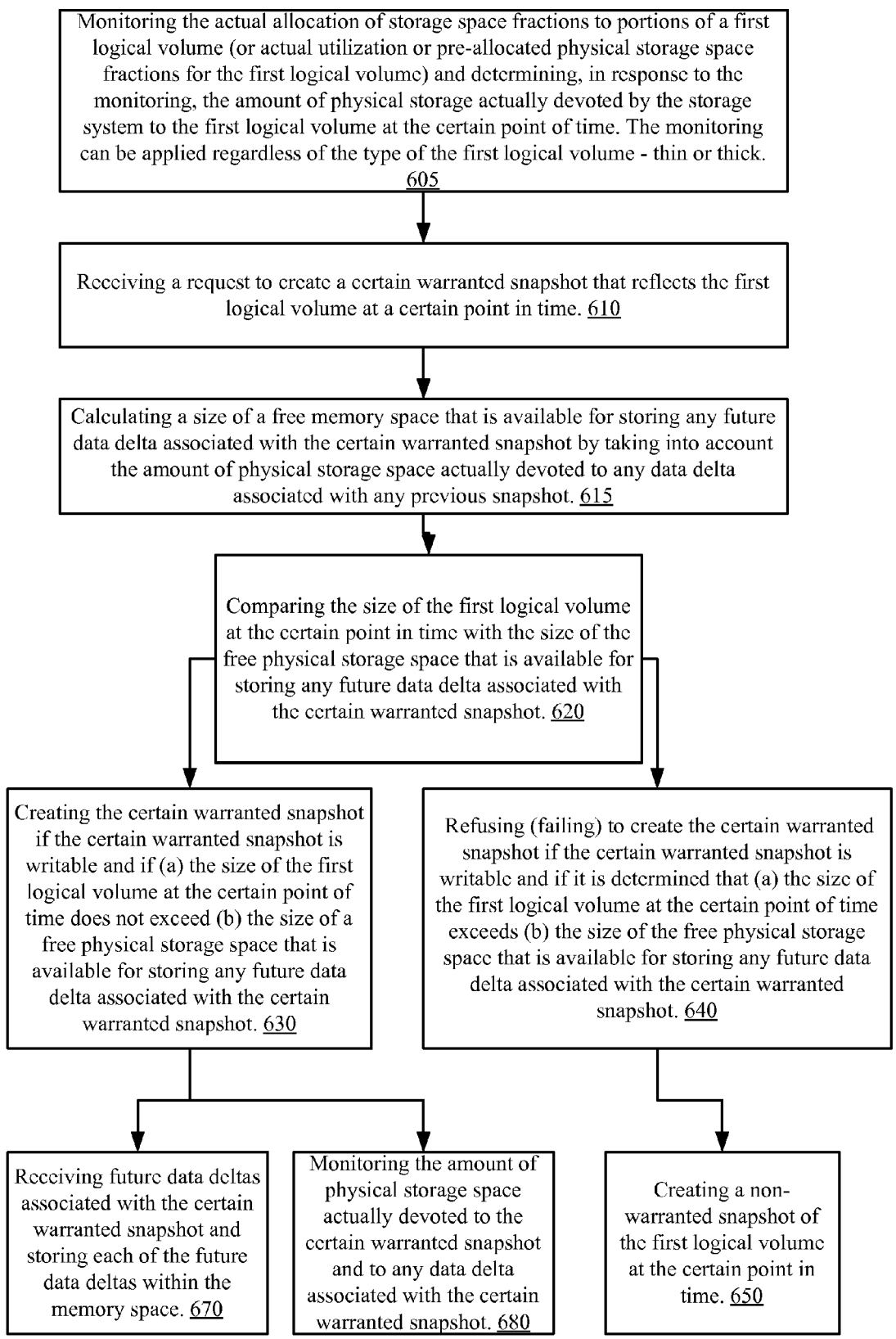
FIG. 11 illustrates a method according to an embodiment of the invention.

As indicated above even the first generation snapshots can include writable snapshots. FIGS. 10 and 11 provide examples of the creation of such a writable snapshot according to an embodiment of the invention.

FIG. 10 illustrates the creation of a writable warranted snapshot SN1(i) of the first logical volume V1(1) at a certain point in time (TSNj(i)) according to an embodiment of the invention.

It is assumed (for simplicity of explanation only) that at point in time TSNj(i) the pool stores data deltas associated with SN1(1)-SN1(i−1). The size of the storage space actually consumed by these data deltas is denoted AUSSN1(1)-AUSSN1(i−1) 37(1,1)-37(i−1).

The size (FSP1S(i) 36(1,i)) of free space FSP1(i) 26(1,i) equals SP1S(1)−(AUSSN1(1)+ ... +AUSSN1(i−1)).

At point in time TSNj(i) the size SV1(i) 30(1,i) of V1 20(1) is smaller than FSP1S(i) 36(1,i) and thus the SN1(i) may be created—the size (MSSN1(1,i) 37(1,i)) of WSSN1(i) 38(1,i) equals SV1(1) 30(1,1) and FSP1S(i)=FSP1S(i)−SV1(i).

FIG. 11 illustrates method 600 according to an embodiment of the invention.

Method 600 may start by stage 605 of monitoring the actual allocation of storage space fractions to portions of a first logical volume (or actual utilization or pre-allocated physical storage space fractions for the first logical volume) and determining, in response to the monitoring, the amount of physical storage actually devoted by the storage system to the first logical volume at a certain point of time. The monitoring may be applied regardless of the type of the first logical volume—thin or thick.

Stage 605 may be followed by stage 610 of receiving a request to create a certain warranted snapshot that reflects the first logical volume at a certain point in time.

Stage 610 may be followed by stage 615 (especially if the certain warranted snapshot is not the first snapshot of the first logical volume) of calculating a size of a free memory space that is available for storing any future data delta associated with the certain warranted snapshot by taking into account the amount of physical storage space actually devoted to any data delta associated with any previous snapshot.

Stage 610 may be followed by stage 620 of comparing the size of the first logical volume at the certain point in time with the size of the free physical storage space that is available for storing any future data delta associated with the certain warranted snapshot.

Stage 620 may be followed by stage 630 of creating the certain warranted snapshot if the certain warranted snapshot is writable and if (a) the size of the first logical volume at the certain point of time does not exceed (b) the size of a free physical storage space that is available for storing any future data delta associated with the certain warranted snapshot.

Stage 630 of creating the certain warranted snapshot may include allocating a certain virtual portion of the physical storage space that includes the free physical storage space for storing any future data delta associated with the certain warranted snapshot; wherein a size of the certain virtual portion equals the size of the first logical volume at the certain point of time.

Stage 620 may be followed by stage 640 of refusing (failing) to create the certain warranted snapshot if the certain warranted snapshot is writable and if it is determined that (a) the size of the first logical volume at the certain point of time exceeds (b) the size of the free physical storage space that is available for storing any future data delta associated with the certain warranted snapshot.

Stage 640 may be followed by stage 650 of creating a non-warranted snapshot of the first logical volume at the certain point in time.

Stage 630 may be followed by stage 670 of receiving future data deltas associated with the certain warranted snapshot and storing each of the future data deltas within the memory space.

Stage 630 may also be followed by stage 680 of monitoring the amount of physical storage space actually devoted to the certain warranted snapshot and to any data delta associated with the certain warranted snapshot.

Stage 680 may also include monitoring the amount of physical storage space allocated to non-warranted snapshots.

Creating Warranted and Non-Warranted Snapshots

Figure 12:
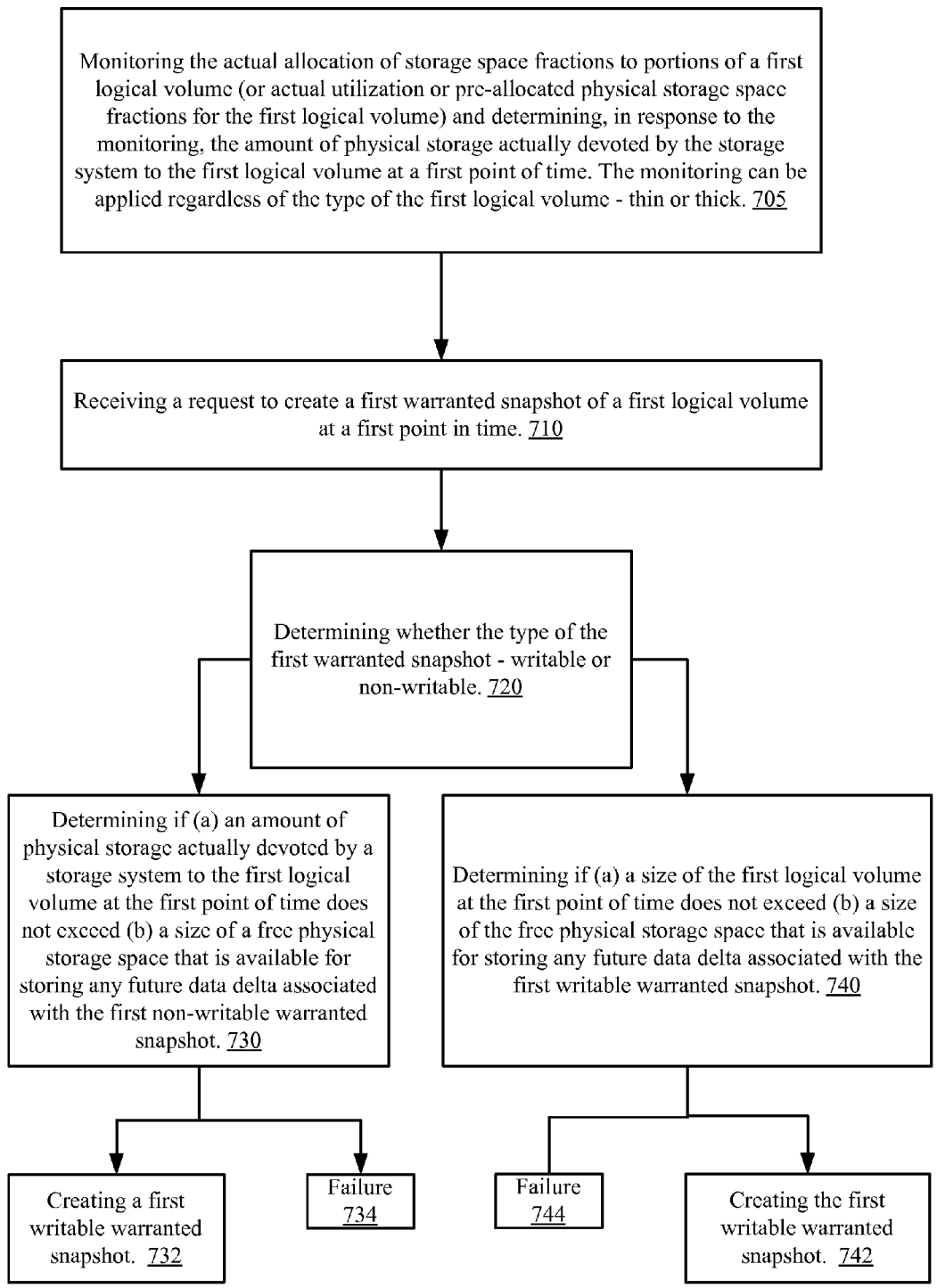
FIG. 12 illustrates a method according to an embodiment of the invention.

FIG. 12 illustrates method 700 according to an embodiment of the invention.

Method 700 may start by stage 705 of monitoring the actual allocation of storage space fractions of a first logical volume (or actual utilization or pre-allocated physical storage space fractions for the first logical volume) and determining, in response to the monitoring, the amount of physical storage actually devoted by the storage system to the first logical volume at a first point of time. The monitoring may be applied regardless of the type of the first logical volume—thin or thick.

Stage 750 may be followed by stage 710 of receiving a request to create a first warranted snapshot of a first logical volume at a first point in time.

Stage 710 may be followed by stage 720 of determining whether the type of the first warranted snapshot—writable or non-writable.

If it is determined that the type of the first warranted snapshot is non-writable then stage 720 may be followed by stage 730 of determining if (a) an amount of physical storage actually devoted by a storage system to the first logical volume at the first point of time does not exceed (b) a size of a free physical storage space that is available for storing any future data delta associated with the first non-writable warranted snapshot.

If the answer is positive—stage 730 may be followed by stage 732 of creating a first writable warranted snapshot. Stage 732 may include allocating a first virtual portion having a size that equals the amount of physical storage actually devoted to the first logical volume at the first point of time, the first virtual portion is associated with the physical storage space and is assigned for storing any future data delta associated with the first non-writable warranted snapshot.

Else—stage 730 may be followed by failure stage 734.

If it is determined that the type of the first warranted snapshot is writable and then stage 720 may be followed by stage 740 of determining if (a) a size of the first logical volume at the first point of time does not exceed (b) a size of the free physical storage space that is available for storing any future data delta associated with the first writable warranted snapshot.

If the answer is positive then stage 740 may be followed by stage 742 of creating the first writable warranted snapshot. Stage 742 may include allocating a first virtual portion having a size that equals the size of the first logical volume at the first point of time, the first virtual portion is associated with the physical storage space and is assigned for storing any future data delta associated with the first writable warranted snapshot.

Else—stage 740 may be followed by failure stage 744.

Figure 13:
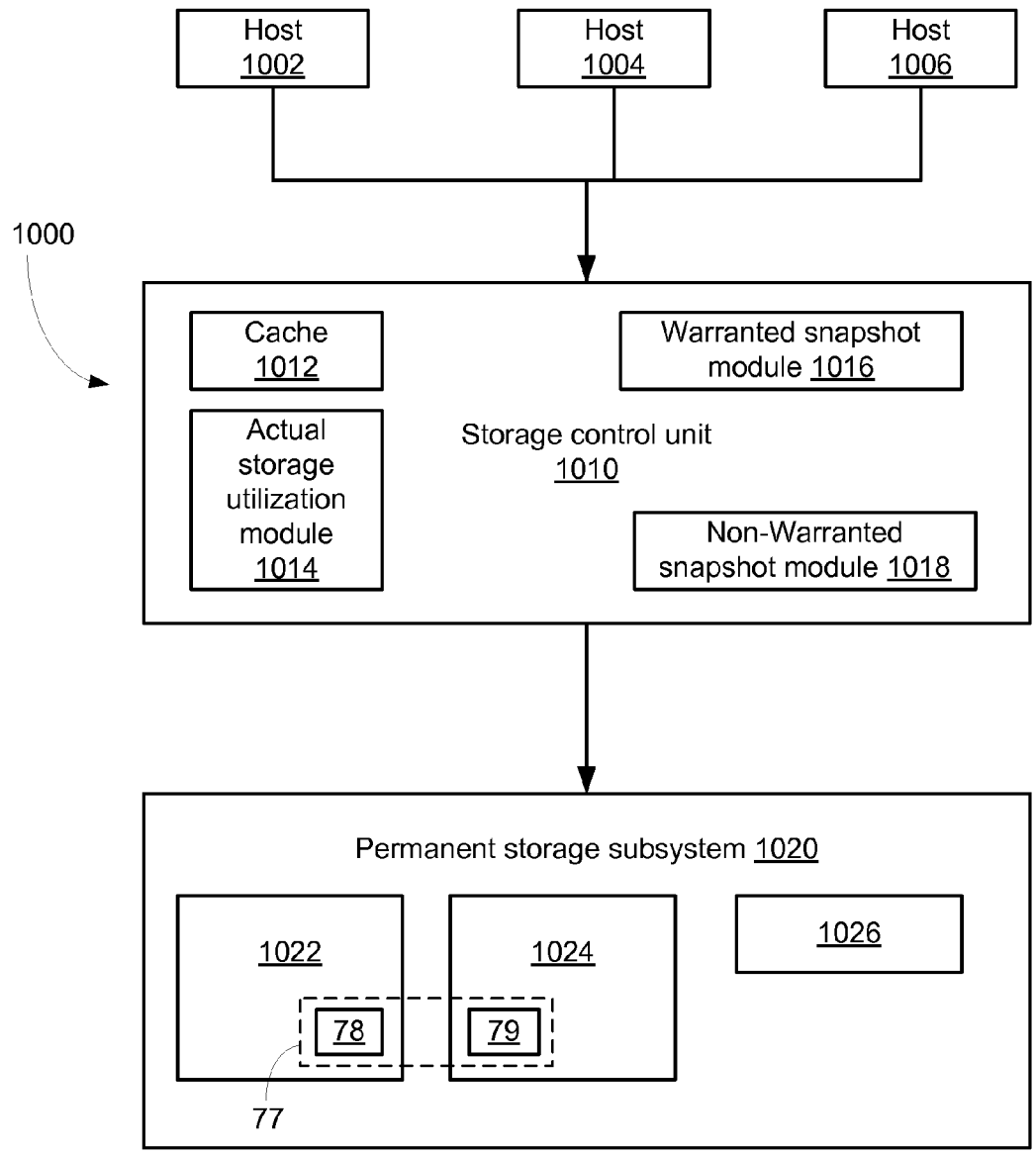
FIG. 13 illustrates a system according to an embodiment of the invention.

FIG. 13 illustrates system 1000 and hosts 1002, 1004 and 1006 according to various embodiments of the invention.

Each one of hosts 1002, 1004 and 1006 may be operated by a user and, additionally or alternatively by a storage administrator. Requests to generate warranted or non-warranted snapshots can be sent from each of these hosts to system 1000.

System 1000 includes a storage control unit 1010 that controls the storage of information into permanent storage subsystem 1020. The storage control unit 1010 includes at least one hardware component.

System 1000 can execute any of the methods illustrated in the specification.

Storage control unit 1010 is illustrated as including cache 1012, actual storage utilization module 1040, warranted snapshot module 1016 and non-warranted snapshot module 1018.

The actual storage utilization module 1040 can monitor the actual utilization of physical storage space of permanent storage subsystem 1020. It (1040) can calculate $ASUVi(j)$ and $ASSUMi(j)$.

Warranted snapshot module 1016 can receive information from the actual storage utilization module 1014 and can determine if warranted snapshot can be created and if so—can manage the creation of warranted snapshots.

Non-warranted snapshot module 1018 can manage the creation of non-warranted snapshots.

The non-warranted snapshot module 1018 can include one or more disks of physical storage elements and can include various physical spaces—such as physical spaces 1022, 1024 and 1026 for storing data deltas associated with warranted snapshots, for storing metadata representing snapshots and for storing information that forms the logical volumes, respectively. For example, physical space 1022 can store data deltas collectively denoted 78 and physical space 1024 can store metadata 79—both form a warranted snapshot 77.

List of Parameter

Index j—used to denote different logical volumes, different partitions.

Index i—used to denote different points in time.

C—Consistency group. It includes volumes $V_1, \ldots V_J$, having volume sizes $VS_1, \ldots VS_J$.

SPC—storage pools for C, of size SPCS.

$SN_j(i)$—the i'th snapshot of logical volume $V_j$ (j ranges between 1 and J), $TSN_j(i)$—the time of creation of $SN_j(i)$.

TC—total (net) capacity of the system. TC is divided into partitions.

PR1 . . . PRJ—partitions. Each partition has its own partial (net) capacity PC1, . . . PCJ. The j'th partition may be denoted PRj, wherein j ranges between 1 and J (PC1+ . . . +PCJ≤TC).

SVj—size of thick volume Vj that may be allocated in each partition PRj.

SPj—storage pool of the j'th partition, having a size of SPjS (SPjS<PCj).

AUSVj(i)—the actual amount of physical storage currently devoted to data associated with Vj at point of time TSNj(i). AUSVj(i)≤SVj.

FSPjS(i)—the free physical storage space in the pool allocated for Vj at point of time TSNj(i)—the size of storage space, which is actually free for storing new data. FSPjS≤SPCS.

SNj(i) is the i'th snapshot of Vj, created at time TSNj(i).

TTj(i)—a point in time which is later than TSNj(i).

MSSNj(i)—the maximal amount of space needed for warranting at the time of creating SNj(i) that, as time goes by, there will always be enough space to store data deltas eventually associated with SNj.

WSSNj(i)—the warranted storage space for SNj(i).

AUSSNj(i)—storage space used for data deltas associated with SNj(i). Clearly AUSSNj(i)<WSSNj(i)

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for providing a warranted snapshot, the method comprises:
   receiving a request to create a first warranted snapshot of a first logical volume at a first point in time;
   creating the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot;
   wherein the creating of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

2. The method according to claim 1, comprising failing to create the first warranted snapshot if the first warranted snapshot is non-writable and if (a) the amount of physical storage actually devoted by the storage system to the first logical volume at the first point of time exceeds (b) the size of the free physical storage space that is available for storing any future data delta associated with the first warranted snapshot.

3. The method according to claim 2, wherein the failing to create the first warranted snapshot is followed by creating a non-warranted snapshot of the first logical volume at the first point in time.

4. The method according to claim 1, further comprising receiving at least one future data delta associated with the first warranted snapshot and storing each of the at least one future data deltas within the physical storage space.

5. The method according to claim 1, further comprising monitoring an amount of physical storage space actually devoted to any data delta associated with the first warranted snapshot.

6. The method according to claim 1, wherein the allocating of the first virtual portion of the physical storage space does not involve actually allocating an actual portion of the physical storage space of a size that equals the amount of physical storage actually devoted to the first logical volume at the first point of time.

7. The method according to claim 1, wherein the creating of the first warranted snapshot comprises actually allocating an actual portion of the physical storage space of a size that equals the amount of physical storage actually devoted to the first logical volume at the first point of time.

8. The method according to claim 1, wherein the physical storage space is associated only with snapshots of the first volume.

9. The method according to claim 1, wherein the physical storage space is associated with a consistency group that comprises the first logical volume and at least one other logical volume.

10. The method according to claim 1, wherein the first logical volume is a thin logical volume and wherein the method comprises monitoring actual allocation of physical storage space fractions to portions of the first logical volume and determining, in response to the monitoring, the amount of physical storage actually devoted by the storage system to the first logical volume at the first point of time.

11. The method according to claim 1, wherein the first logical volume is a thick logical volume and wherein the method comprises monitoring a utilization of physical storage space fractions of a physical storage space allocated to the first logical volume and determining, in response to the monitoring, the amount of physical storage actually devoted by the storage system to the first logical volume at the first point of time.

12. The method according to claim 11, comprising updating a size of the first virtual portion to the amount of physical storage space actually devoted to any data delta associated with the first warranted snapshot.

13. The method according to claim 1, comprising:
receiving a request to create a second warranted snapshot of the first logical volume at a second point in time;
wherein the first warranted snapshot is a last snapshot of the first logical volume that was created before the second point in time;
calculating a size of a free physical storage space that is available for storing any future data delta associated with the second warranted snapshot by taking into account an amount of physical storage space actually devoted to any data delta associated with the first warranted snapshot;
creating the second warranted snapshot if the second warranted snapshot is non-writable and if (a) an amount of physical storage actually devoted by the storage system to the first logical volume at the second point of time does not exceed (b) a size of a free physical storage space that is available for storing any future data delta associated with the second warranted snapshot;
wherein the creating of the second warranted snapshot comprises allocating a second virtual portion of the physical storage space that comprises the free physical storage space for storing any future data delta associated with the second warranted snapshot; wherein a size of the second virtual portion equals the amount of physical storage actually devoted to the first logical volume at the second point of time.

14. The method according to claim 1, comprising
receiving a request to create a certain warranted snapshot that reflects the first logical volume at a certain point in time;
creating the certain warranted snapshot if the certain warranted snapshot is writable and if (a) a size of the first logical volume at the certain point of time does not exceed (b) a size of a free physical storage space that is available for storing any future data delta associated with the certain warranted snapshot;
wherein the creating of the certain warranted snapshot comprises allocating a certain virtual portion of the physical storage space that comprises the free physical storage space for storing any future data delta associated with the certain warranted snapshot; wherein a size of the certain virtual portion equals the size of the first logical volume at the certain point of time.

15. The method according to claim 1, comprising:
receiving a request to create, at a point in time that follows the first point in time, a writable warranted snapshot that reflects the first warranted snapshot;
creating the writable warranted snapshot if the (a) a size of the first volume at the point in time does not exceed (b) a size of a free physical storage space that is available for storing any future data deltas associated with the writable warranted snapshot;

wherein the creating of the writable warranted snapshot comprises allocating a virtual portion of the physical storage space for storing and any future data deltas associated with the writable warranted snapshot; wherein a size of the virtual portion equals the size of the first logical volume at the point of time.

16. A method for providing a warranted snapshot, the method comprises:
receiving a request to create a first warranted snapshot of a first logical volume at a first point in time;
determining whether a type of the first warranted snapshot is writable or non-writable;
creating a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot;
creating a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot;
wherein the creating of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot;
wherein the creating of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

17. A non-transitory computer readable medium that stores instructions to be executed by a computerized system for:
receiving a request to create a first warranted snapshot of a first logical volume at a first point in time;
creating the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot;
wherein the creating of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

18. A non-transitory computer readable medium that stores instructions to be executed by a computerized system for:
receiving a request to create a first warranted snapshot of a first logical volume at a first point in time;
determining whether a type of the first warranted snapshot is writable or non-writable;

creating a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot;

creating a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot;

wherein the creating of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot;

wherein the creating of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

19. A system comprising:

a storage control unit arranged to receive a request to create a first warranted snapshot of a first logical volume at a first point in time;

a warranted snapshot module arranged to create the first warranted snapshot if the first warranted snapshot is non-writable and if (a) an amount of physical storage actually devoted by a storage system to the first logical volume at the first point of time does not exceed (b) a size of a free physical storage space that is available for storing any future data delta associated with the first warranted snapshot;

wherein a creation of the first warranted snapshot comprises allocating a first virtual portion of a physical storage space that comprises the free physical storage space for storing any future data delta associated with the first warranted snapshot; wherein a size of the first virtual portion equals the amount of physical storage actually devoted to the first logical volume at the first point of time.

20. A system comprising:

a storage control unit arranged to receive a request to create a first warranted snapshot of a first logical volume at a first point in time and to determine whether a type of the first warranted snapshot is writable or non-writable;

a warranted snapshot module arranged to create a first non-writable warranted snapshot if it is determined that the type of the first warranted snapshot is non-writable and if (a) an amount of physical storage actually devoted by a storage system to the first logical volume at the first point of time does not exceed (b) a size of a free physical storage space that is available for storing any future data delta associated with the first non-writable warranted snapshot;

a non-warranted snapshot module arranged to create a first writable warranted snapshot if it is determined that the type of the first warranted snapshot is writable and if (a) a size of the first logical volume at the first point of time does not exceed (b) a size of the free physical storage space that is available for storing any future data delta associated with the first writable warranted snapshot;

wherein a creation of the first non-writable warranted snapshot comprises allocating a first virtual portion having a size that equals the amount of physical storage actually devoted to the first logical volume at the first point of time, the first virtual portion is associated with the physical storage space and is assigned for storing any future data delta associated with the first non-writable warranted snapshot;

wherein a creation of the first writable warranted snapshot comprises allocating a first virtual portion having a size that equals the size of the first logical volume at the first point of time, the first virtual portion is associated with the physical storage space and is assigned for storing any future data delta associated with the first writable warranted snapshot.

* * * * *